United States Patent
Aoki

(10) Patent No.: US 12,251,970 B2
(45) Date of Patent: Mar. 18, 2025

(54) TIRE

(71) Applicant: Sumitomo Rubber Industries, Ltd., Kobe (JP)

(72) Inventor: Daichi Aoki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/277,707

(22) PCT Filed: Feb. 17, 2022

(86) PCT No.: PCT/JP2022/006415
§ 371 (c)(1),
(2) Date: Aug. 17, 2023

(87) PCT Pub. No.: WO2022/181443
PCT Pub. Date: Sep. 1, 2022

(65) Prior Publication Data
US 2024/0123771 A1    Apr. 18, 2024

(30) Foreign Application Priority Data
Feb. 25, 2021  (JP) .................. 2021-029073

(51) Int. Cl.
*B60C 1/00* (2006.01)
*B60C 5/14* (2006.01)
(Continued)

(52) U.S. Cl.
CPC .............. *B60C 19/00* (2013.01); *B60C 5/14* (2013.01); *B60C 23/0493* (2013.01); *B60C 1/00* (2013.01); *B60C 2019/004* (2013.01)

(58) Field of Classification Search
CPC ............ B60C 23/0491; B60C 23/0493; B60C 149/00; B60C 1/0008
See application file for complete search history.

(56) References Cited

U.S. PATENT DOCUMENTS

| 2001/0045250 A1 | 11/2001 | Koch et al. |
| 2010/0181002 A1 | 7/2010 | Miyazaki |

(Continued)

FOREIGN PATENT DOCUMENTS

| CA | 2358827 A1 | 8/2000 |
| EP | 0689950 A2 * | 1/1996 |

(Continued)

OTHER PUBLICATIONS

International Search Report, issued in PCT/JP2022/006415, PCT/ISA/210, dated Mar. 22, 2022.

(Continued)

*Primary Examiner* — Justin R Fischer
(74) *Attorney, Agent, or Firm* — Birch, Stewart, Kolasch & Birch, LLP

(57) ABSTRACT

A pneumatic tire (1) includes: a tread portion (2) including a land portion (24) divided by a plurality of main grooves (22) formed on a tread surface (21); an inner liner (7) constituting a tire inner surface (7A) on an inner side of the tread portion (2); and a mount member (10) which is provided on the tire inner surface (7A), and to which electric equipment can be attached. In the pneumatic tire (1), Complex elastic modulus E*1 of a rubber composition constituting the mount member (10) is larger than complex elastic modulus E*2 of a rubber composition constituting the inner liner (7).

13 Claims, 4 Drawing Sheets

(51) Int. Cl.
    *B60C 19/00*     (2006.01)
    *B60C 23/00*     (2006.01)
    *B60C 23/04*     (2006.01)

(56) References Cited

U.S. PATENT DOCUMENTS

| | | |
|---|---|---|
| 2014/0261944 A1 | 9/2014 | Papakonstantopoulos et al. |
| 2016/0052347 A1* | 2/2016 | Nagai .................... B29D 30/58 |
| | | 152/553 |
| 2017/0136832 A1 | 5/2017 | So et al. |
| 2021/0260938 A1 | 8/2021 | Tanno et al. |

FOREIGN PATENT DOCUMENTS

| | | |
|---|---|---|
| EP | 0638445 B1 * | 10/1997 |
| JP | 2000-168320 A | 6/2000 |
| JP | 2002-541003 A | 12/2002 |
| JP | 2004-155352 A | 6/2004 |
| JP | 2007-69775 A | 3/2007 |
| JP | 2009-113794 A | 5/2009 |
| JP | 2017-88171 A | 5/2017 |
| WO | WO 2019/244349 A1 | 12/2019 |

OTHER PUBLICATIONS

Written Opinion of the International Searching Authority, issued in PCT/JP2022/006415, PCT/ISA/237, dated Mar. 22, 2022.

* cited by examiner

[FIG.1]
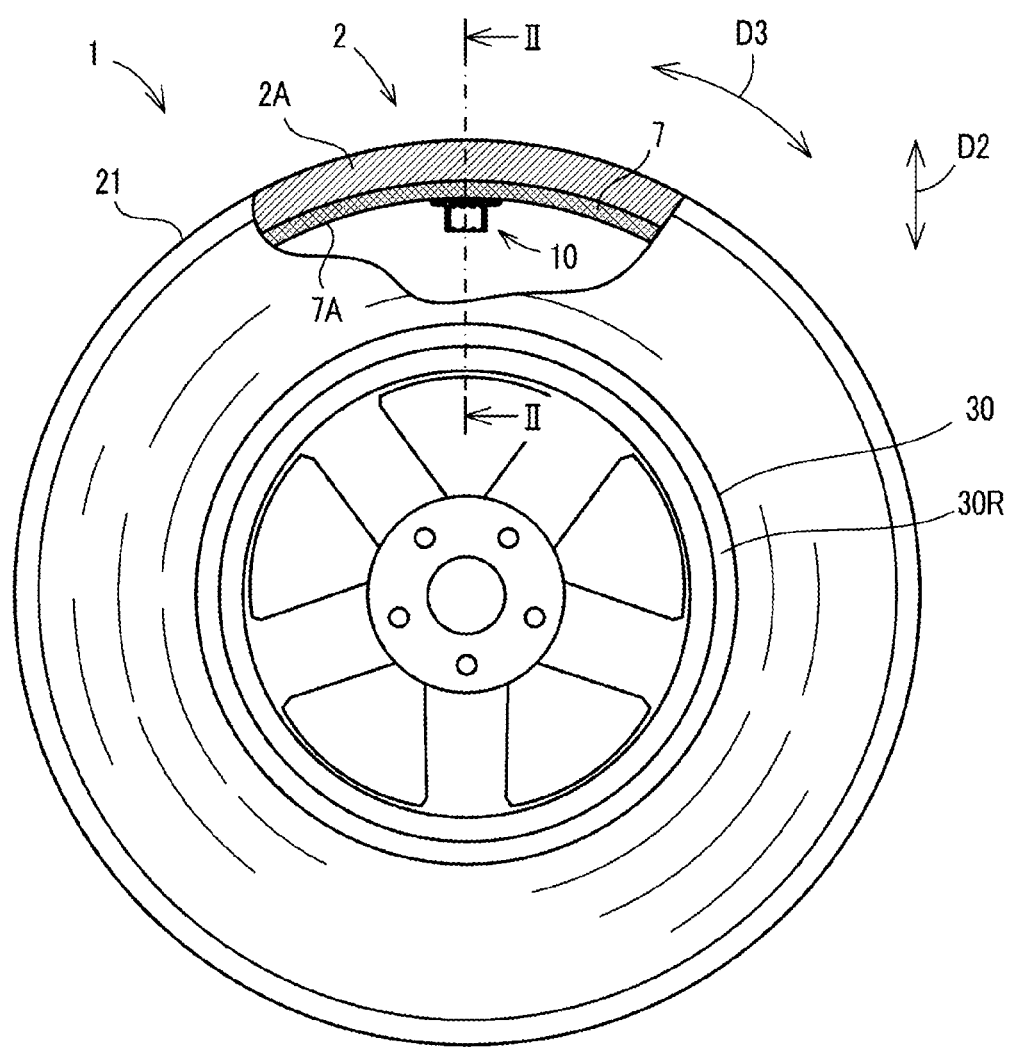

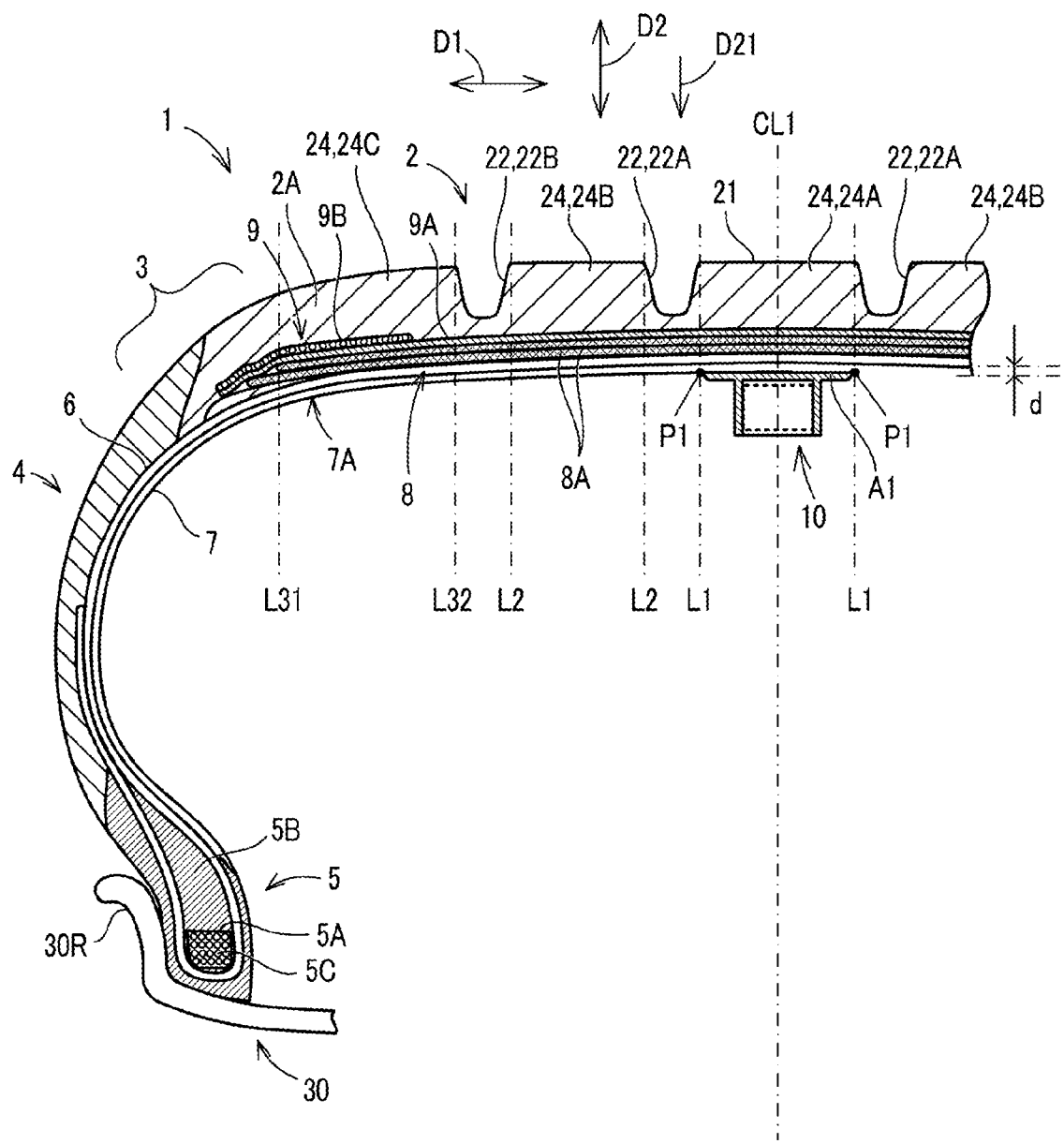
[FIG.2]

[FIG.3A]
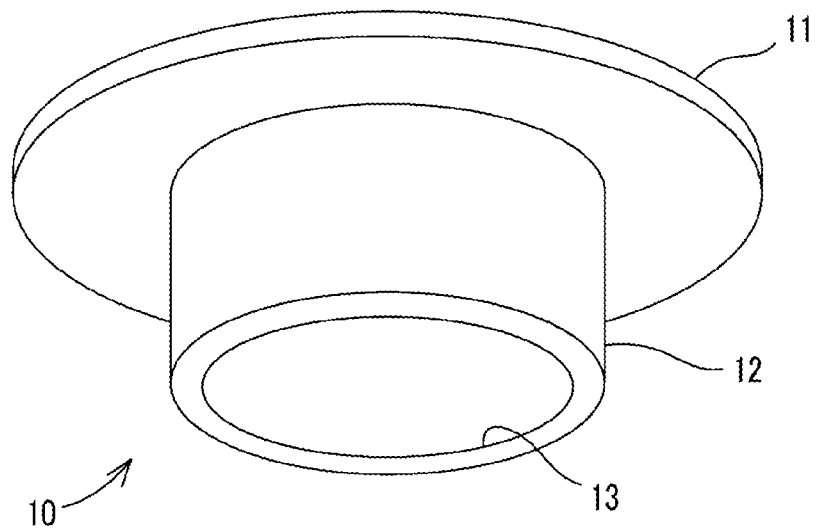
[FIG.3B]
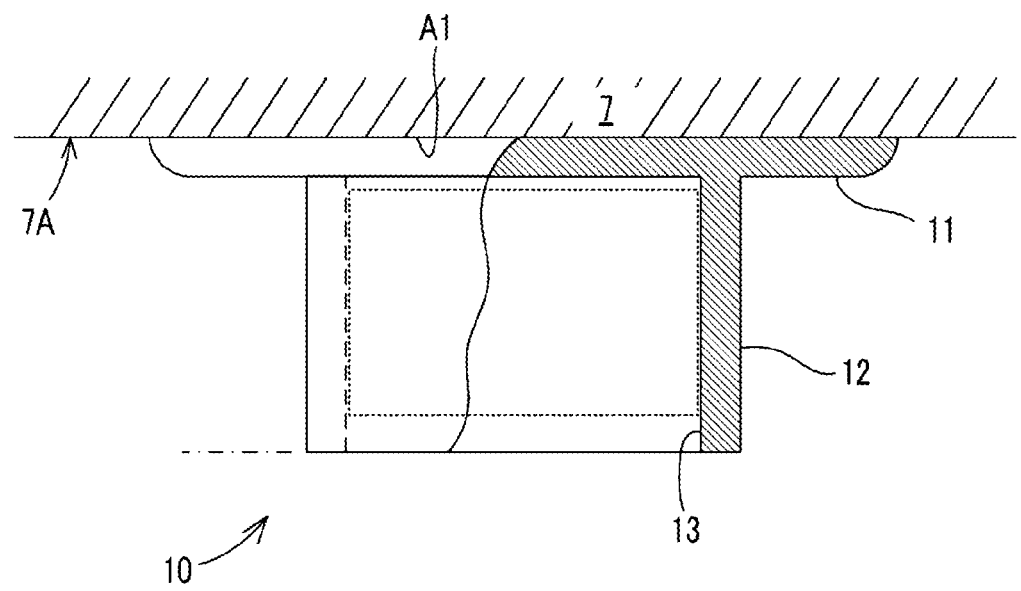

【FIG.4A】
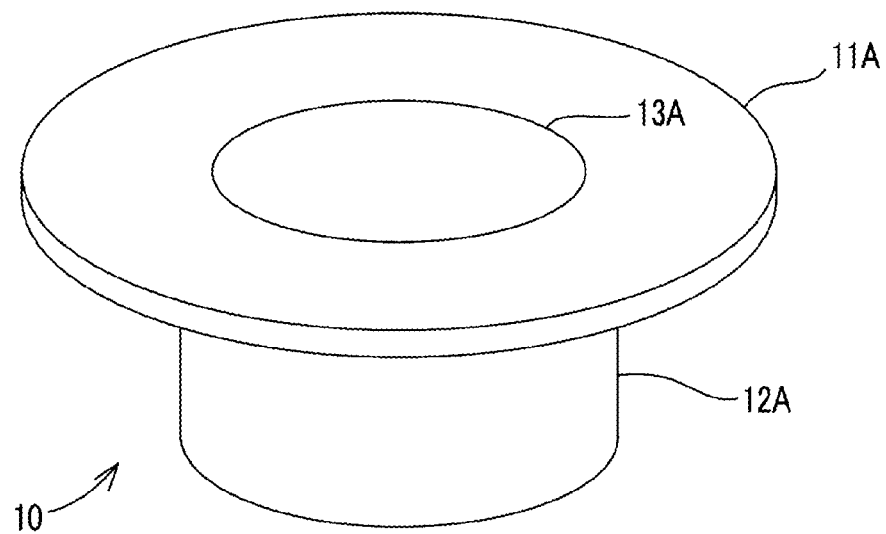
【FIG.4B】
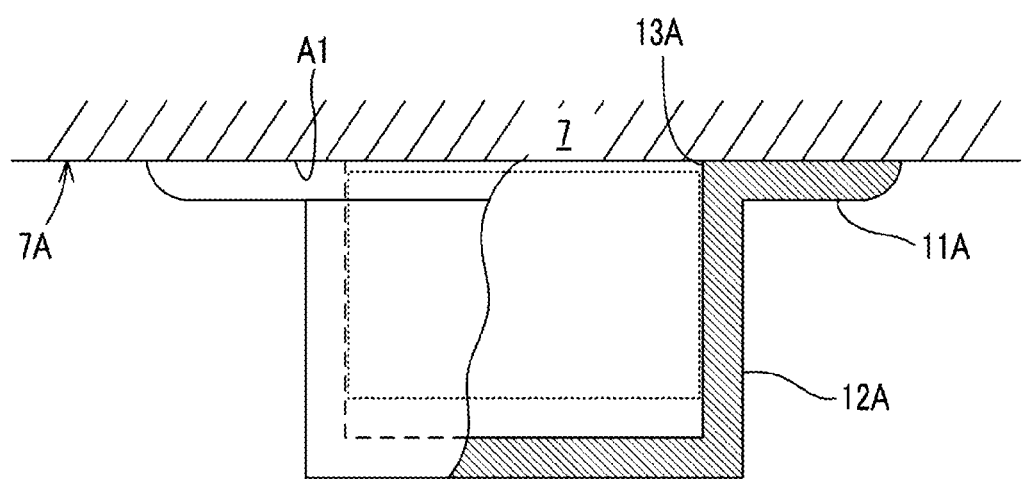

TIRE

TECHNICAL FIELD

The present disclosure relates to a tire mounted on a vehicle.

BACKGROUND ART

Conventionally, there has been proposed a tire pressure monitoring system (TPMS) for detecting and monitoring an air pressure (tire pressure) of a tire mounted on a vehicle (see PTL 1). The tire is attached with a sensor unit composed of: a sensor configured to detect a tire pressure; and a transmitter configured to transmit a detection value of the tire pressure. The tire pressure monitoring system monitors the change of the tire pressure based on a signal transmitted from the sensor unit.

CITATION LIST

Patent Literature

[PTL 1] Japanese Patent Application Publication No. 2004-155352

SUMMARY OF THE INVENTION

Problems to be Solved by the Invention

Meanwhile, in recent years, for safe and comfortable driving of a vehicle, it is considered important to appropriately detect and manage tire information that include not only the tire pressure, but temperature or vibration of the tire, and wear state of a tread portion of the tire. To detect the tire information, electric equipment such as a sensor for detecting the tire information may be attached to the tire. To acquire the tire information accurately, the electric equipment is preferably attached to an inner surface of the tire. However, when a vehicle on which a tire attached with the electric equipment is mounted, travels, a vibration transmitted from the road surface to the tire propagates in the tread portion and is transmitted to the electric equipment, causing the electric equipment to vibrate inside the tire. In addition, each time the tire makes one round, a load of the electric equipment is periodically applied to the road surface via the tread portion, resulting in a periodical application of a vibration to the tread portion. Both the vibration transmitted from the tread portion to the electric equipment, and the vibration transmitted from the electric equipment to the tread portion, cause a noise (noisy sound, noise, etc.) such as a road noise during travelling of the vehicle. Such vibrations remarkably appear during high-speed travelling of the vehicle.

It is an object of the present disclosure to restrict a noise from being generated, during travelling of a vehicle, in a tire including a mount member to which electric equipment such as a sensor can be attached.

Solution to the Problems

A tire according to an aspect of the present disclosure includes: a tread portion constituting a tire surface; an inner liner constituting a tire inner surface; and a mount member which is provided on the tire inner surface, and to which electric equipment can be attached. In the tire, complex elastic modulus $E*1$ at 70° C. of a first rubber composition constituting the mount member is larger than complex elastic modulus $E*2$ at 70° C. of a second rubber composition constituting the inner liner.

With the above-described configuration of the tire, the inner liner can be lower than the mount member in hardness, and the inner liner can be a viscoelastic material that is softer than the mount member. With this configuration, in the tire including the mount member to which the electric equipment is attached, a vibration transmitted from the tread portion to the mount member and the electric equipment during travelling of a vehicle is attenuated by the inner liner, and a vibration transmitted from the mount member and the electric equipment to the tread portion is attenuated by the inner liner. As a result, it is possible to restrict a noise caused by the load of the mount member and the electric equipment.

Advantageous Effects of the Invention

According to the present disclosure, it is possible to restrict a noise (noisy sound, noise, etc.) from being generated, during travelling of a vehicle, in a tire including a mount member to which electric equipment such as a sensor can be attached.

BRIEF DESCRIPTION OF THE DRAWINGS

FIG. 1 is a side diagram of a tire according to an embodiment of the present disclosure.

FIG. 2 is a partial cross-sectional diagram of the tire, showing a cross section taken along a plane II-II shown in FIG. 1.

FIG. 3A is a schematic diagram showing an example of a mount member attached to the tire.

FIG. 3B is a schematic diagram showing an example of the mount member attached to the tire.

FIG. 4A is a schematic diagram showing another example of the mount member attached to the tire.

FIG. 4B is a schematic diagram showing another example of the mount member attached to the tire.

DESCRIPTION OF EMBODIMENTS

The following describes an embodiment of the present disclosure with reference to the accompanying drawings. It should be noted that the following embodiment is an example of a specific embodiment of the present disclosure and should not limit the technical scope of the present disclosure.

FIG. 1 is a side diagram of a pneumatic tire 1 (hereinafter, merely referred to as "tire 1") according to an embodiment of the present disclosure, viewed from a side thereof. FIG. 2 is a cross-sectional diagram of the tire 1 taken along a cut plane II-II shown in FIG. 1. FIG. 1 partially shows a cross-sectional structure of an equator plane CL1 (see FIG. 2). Here, an up-down direction when viewed on the paper in FIG. 1 and FIG. 2 is a radial direction D2 of the tire 1. A left-right direction when viewed on the paper in FIG. 2 is a width direction D1 of the tire 1. In addition, an arrow D3 shown in FIG. 1 is a peripheral direction of the tire 1. It is noted that since the tire 1 is formed symmetrical to the width direction D1 with respect to the equator plane CL1, FIG. 2 shows a partial cross-sectional diagram of the tire 1, omitting the other part.

The tire 1 has a rubber material as a main component and is mainly used mounted on a vehicle such as an automobile. As shown in FIG. 1 and FIG. 2, the tire 1 is built in a rim 30R of a wheel 30. The rim 30R is a normal rim that is described below. The tire 1 is a pneumatic tire in which air is filled in a hollow part between the rim 30R and an inner surface 7A of the tire 1. The inner pressure of the inside of the tire 1 is adjusted to a normal inner pressure that is described below.

In the present specification, a state where the inner pressure of the tire 1 built in the rim 30R is adjusted to the normal inner pressure and no load is applied to the tire 1, is referred to as a normal state. FIG. 1 and FIG. 2 show the tire 1 in the normal state, mounted on the wheel 30. In the present embodiment, unless specifically mentioned, shapes of the tire 1 and each part thereof are shapes in the normal state, and the dimension and angle of the tire 1 and each part thereof are measured in the normal state.

Here, the normal rim is a rim specified by a standard on which the tire 1 is based. Specifically, the normal rim is the "standard rim" specified by a standard (JATMA standard) of JATMA (The Japan Automobile Tyre Manufacturers Association, Inc.), the "design rim" specified by a standard (TRA standard) of TRA (The Tire and Rim Association, Inc.), and the "measuring rim" specified by a standard (ETRTO standard) of ETRTO (European Tyre Rim Technical Organisation).

The normal inner pressure is an inner pressure specified by a standard on which the tire 1 is based. Specifically, the normal inner pressure is the "maximum air pressure" specified by the JATMA standard, is the "maximum value" shown in "Tire load limits at various cold inflation pressures" of the TRA standard, and is "inflation pressure" in the ETRTO standard.

The tire 1 according to the present embodiment is suitably used as a radial tire for automobiles. It is noted that the tire 1 is a pneumatic tire for use in a vehicle, and not limited to use in automobiles, the tire 1 may be a pneumatic tire for use in various types of vehicles such as a passenger car, a large-sized vehicle such as a truck or a bus, a motorcycle, a racing vehicle, an industrial vehicle, a special vehicle, or a vehicle for loading such as a trailer or a carriage. In addition, the tire 1 is not limited to a radial tire, but is suitably used as a bias tire, too. In particular, the tire 1 is suitably used as a tire for use in a passenger car in which various types of electric equipment such as a sensor are installed, and which is required to have high convenience and low noise property during high-speed travelling. It is noted that the tire for passenger car refers to a tire mounted on an automobile that travels with four wheels, and the maximum load capacity is 1,000 kg or less.

The maximum load capacity is not particularly limited as far as it is 1,000 kg or less, but in general, as the maximum load capacity increases, the tire weight tends to increase, a vibration that occurs to a tread portion 2 of the tire 1 increases, and the noise during travelling tends to increase. As a result, the maximum load capacity is preferably 900 kg or less, more preferably 800 kg or less, and still more preferably 700 kg or less.

In addition, from a viewpoint of alleviating the vibration at the tread portion 2, the tire weight of the tire 1 is preferably 20 kg or less, more preferably 15 kg or less, and still more preferably 12 kg or less, 10 kg or less, or 8 kg or less. It is noted that the tire weight includes weights of the electric equipment and a mount member 10 described below, and in a case where sealant or sponge is provided in an inner space part of the tire 1, the tire weight includes the weight thereof, as well.

As shown in FIG. 2, the tire 1 includes the tread portion 2, a pair of shoulder portions 3 provided at opposite positions of the tread portion 2 in the width direction D1, a pair of side wall portions 4 that extend from the shoulder portions 3 in a center direction D21 directed toward the center axis of the tire 1 (inner side in the radial direction D2), and a pair of bead portions 5 located at ends of the side wall portions 4 on the side of the center direction D21.

Furthermore, the tire 1 includes: a carcass 6 (an example of a carcass portion of the present disclosure) that extends from the tread portion 2 to bead cores 5A of the bead portions 5 via the shoulder portions 3 and the side wall portions 4; an inner liner 7 that constitutes the inner surface 7A of the tire 1; a belt portion 8 and a band portion 9 that are disposed at the inside of the tread portion 2 in the radial direction D2; and a mount member 10 mounted to the inner surface 7A of the tire 1 (namely, the inner surface 7A of the inner liner 7).

The tread portion 2 is configured to contact the road surface during travelling of the vehicle. The tread portion 2 includes a tread rubber 2A that is composed of a vulcanized rubber composition (vulcanized rubber). The outer surface of the tread portion 2 is a tread surface 21 (an example of a tire surface) being a contact surface to contact the road surface. In the present embodiment, the tread surface 21 is an approximately flat surface with respect to the width direction D1. That is, the tire 1 is formed such that the tread portion 2 is in a flat shape with respect to the width direction D1.

A rubber composition that constitutes the tread rubber 2A includes a rubber component and additives such as: a filler (a reinforcing agent) such as carbon black or silica; oil; resins such as phenol resin; processing aid; stearic acid; zinc oxide; sulfur; and vulcanization accelerator.

Examples of the rubber component include general rubber materials, such as an isoprene-based rubber, a butadiene rubber (BR), a styrene-butadiene rubber (SBR), a styrene-isoprene rubber, a styrene-isoprene-butadiene rubber (SIBR), an isoprene-butadiene rubber, an acrylonitrile-butadiene rubber (NBR), an acrylonitrile-styrene-butadiene rubber, a chloroprene rubber (CR), or chlorosulfonated polyethylene. Examples of the isoprene-based rubber include natural rubber (NR), epoxidized natural rubber (ENR), isoprene rubber (IR), reformed NR, modified NR, and modified IR. In the rubber component, one of the above-mentioned rubber materials may be used alone, or two or more of the rubber materials may be used in combination, blended at a predetermined blend ratio.

A tread pattern is formed on the tread surface 21 so that each of tire performances such as grip performance, braking performance, drainage function, and wear suppression is exhibited. The tread pattern is formed of a plurality of recessed grooves formed on the tread surface 21. On the tread surface 21, a plurality of main grooves 22 (an example of peripheral-direction grooves of the present disclosure) continuously extending in the peripheral direction D3 (see FIG. 1) of the tire 1 are formed as the recessed grooves. It is noted that, for example, a plurality of lug grooves (not shown) crossing the main grooves 22 or a plurality of sipes that are narrower in width and shallower in depth than the main grooves 22 and the lug grooves may be formed on the tread surface 21. It is noted that the recessed grooves mentioned here refer to those having more than 2.0 mm of groove width and more than 5.0 mm of groove depth.

The tread pattern formed on the tread surface 21 may be what is called a rib type pattern having a plurality of main grooves 22, or what is called a rib-lug type pattern having the main grooves 22 and the lug grooves. However, the tread portion 2 of the tire 1 is not limited to one in which any one of these patterns is formed on the tread surface 21. For example, in the tread portion 2, what is called a lug type pattern mainly having the lug grooves, or what is called a block type pattern having independent blocks, may be formed on the tread surface 21. In addition, the tread pattern may be asymmetrical to the width direction of the ground contact surface.

In the present embodiment, the tread pattern formed on the tread surface 21 is symmetrical to the width direction D1 with respect to the equator plane CL1. Specifically, as shown in FIG. 2, four main grooves 22 are formed on the tread surface 21 along the peripheral direction D3. The four main grooves 22 are disposed at predetermined intervals in the width direction D1 of the tire 1 such that two main grooves 22 are disposed in each region of the tread surface 21 outside the equator plane CL1 in the width direction D1. Accordingly, the tread portion 2 includes five land portions 24 divided in the width direction D1 by the four main grooves 22 extending along the peripheral direction D3. It is noted that although the present embodiment describes, as one example, a configuration where, as shown in FIG. 2, four main grooves 22 are formed on the tread surface 21, the present disclosure is not limited to the configuration. For example, the main grooves 22 may be located asymmetrically to the width direction D1. In addition, the number of the main grooves 22 is not limited to four, but may be less than four or five or more. In addition, one of the main grooves 22 may be positioned on the equator plane CL1.

As shown in FIG. 2, the five land portions 24 include one crown land portion 24A, two middle land portions 24B, and two shoulder land portions 24C. The shoulder land portions 24C are disposed in the vicinity of the shoulder portions 3, and are sectioned between the opposite ends of the tread portion 2 in the width direction D1 and two second main grooves 22B disposed at most outside in the width direction D1. The middle land portions 24B are sectioned between two first main grooves 22A disposed in the vicinity of the equator plane CL1 and the two second main grooves 22B. In addition, the crown land portion 24A is disposed at a center part of the tread portion 2 of the tire 1 in the width direction D1. In the present embodiment, the crown land portion 24A is disposed at a part of the tread portion 2 that crosses the equator plane CL1. For example, the crown land portion 24A occupies an area of the tread portion 2 that extends from a point crossing the equator plane CL1 in both directions of the width direction D1 by a predetermined distance. The center of the area matches the equator plane CL1 and the area corresponds to a ratio that is determined in a range of 10% to 50% of the ground contact width of the ground contact surface of the tread portion 2. For example, the ratio is preferably 30%, and more preferably 20%. In addition, the crown land portion 24A is disposed at an area of the tread portion 2 that is sectioned between the two first main grooves 22A. For example, the crown land portion 24A is sectioned to be sandwiched between the two first main grooves 22A.

The crown land portion 24A may extend straight or in a zigzag shape along the peripheral direction D3. In addition, the crown land portion 24A may, in the peripheral direction D3, obliquely extend, extend in a curved shape, or extend in an arc shape. For the crown land portion 24A to be in the above-described shape, the two first main grooves 22A located on both sides of the crown land portion 24A in the width direction D1 are each formed to extend straight, extend in a zigzag shape, obliquely extend, extend in a curved shape, or extend in an arc shape along the peripheral direction D3. In addition, the crown land portion 24A may have a plurality of blocks divided in the peripheral direction D3 by lateral grooves, such as the lug grooves, or inclined grooves, or a plurality of semi blocks divided in the peripheral direction D3 by lateral grooves or inclined grooves such as the sipes. It is noted that the land portions 24 other than the crown land portion 24A also extend along the peripheral direction D3, and are formed in the same shape as the crown land portion 24A.

It is noted that in a case where the tire 1 is for a passenger car, the groove width of the first main grooves 22A is, for example, 4.0% to 7.0% of the width of the tread portion 2. In addition, the groove width of the second main grooves 22B is, for example, 2.5% to 4.5% of the width of the tread portion 2. In addition, the groove depth of the first main grooves 22A and the second main grooves 22B is, for example, 5 mm to 10 mm.

The shoulder portions 3 correspond to corner parts of the tire 1 between the tread portion 2 and the side wall portions 4. The shoulder portions 3 are parts that connect the tread portion 2 to the side wall portions 4, and are formed in a round shape (curved shape) extending from opposite end parts of the tread portion 2 in the width direction D1 to upper end parts of the side wall portions 4.

The side wall portions 4 are composed of a vulcanized rubber composition (vulcanized rubber). The side wall portions 4 are disposed outside the carcass 6 in the width direction D1. The side wall portions 4 connect to opposite end parts, in the width direction D1, of the tread rubber 2A constituting the tread portion 2, and extend along the carcass 6 in the center direction D21. The side wall portions 4 protect the carcass 6 at the sides of the tire 1.

The carcass 6 is disposed inside the tread portion 2 and the pair of side wall portions 4, and disposed more on the side of the tread portion 2 and the pair of side wall portions 4 than the inner liner 7 is. The carcass 6 is composed of at least one carcass ply. The carcass ply is a cord layer including a large number of carcass cords (not shown) that extend in a direction crossing the equator plane CL1 of the tire 1. The carcass ply is obtained by covering these carcass cords with topping rubber made of a predetermined rubber composition (vulcanized rubber). The large number of carcass cords are arranged to align along the peripheral direction D3 of the tire 1 in a state of crossing the equator plane CL1 of the tire 1 at a predetermined angle (for example, an angle in the range of 70 to 90 degrees). As the carcass cords, for example, cords composed of organic fibers such as nylon fibers, polyester fibers, rayon fibers, and aramid fibers (hereinafter referred to as "organic fiber cords") are used.

The inner liner 7 is disposed more inside than the carcass 6 to form the inner surface 7A of the tire 1. The inner liner 7 is made of a rubber composition (vulcanized rubber) having air shutoff property, and has a role of holding the internal pressure of the tire 1.

The inner liner 7 is bonded to an inner surface of the carcass 6. It is noted that the inner liner 7 may be directly bonded to the carcass 6, or may be bonded to an insulation layer that is disposed more inside than the carcass 6 in the radial direction.

A rubber composition (second rubber composition) that constitutes the inner liner 7 includes a rubber component and additives such as: a filler (a reinforcing agent) such as carbon black; oil; resins such as phenol resin; processing aid; stearic acid; zinc oxide; sulfur; and vulcanization accelerator.

As the rubber component, a rubber material mainly composed of a butyl-based rubber having excellent air permeation resistance is used. Examples of the butyl-based rubber include: a halogenated butyl rubber (X-IIR) such as a butyl rubber (IIR), a brominated butyl rubber (BR-IIR), and a chlorinated butyl rubber (CR-IIR), a copolymer of isobutylene and p-alkylstyrene; and a halide of the copolymer. Of these, from a viewpoint of improving sheet processability and air shutoff property in a good balance, the halogenated butyl rubber is preferable and the brominated butyl rubber and the chlorinated butyl rubber are more preferable. In addition, in the rubber component, one of the above-mentioned butyl-based rubbers may be used alone, or two or more of the rubber materials may be used in combination, blended at a predetermined blend ratio. It is noted that a viscoelastic material mainly composed of a plastic elastomer having a low air permeability can be applied to the rubber composition constituting the inner liner 7.

It is preferable that, as the butyl-based rubber, a normal butyl-based rubber (a butyl-based rubber other than a reclaimed butyl-based rubber) is used in combination with the reclaimed butyl-based rubber. Since the reclaimed butyl-based rubber normally has a high content of non-halogenated butyl rubber (regular butyl rubber), it is possible to secure excellent air shutoff property and vulcanization rate by using it in combination with a halogenated butyl rubber.

The total content of the butyl-based rubber in 100% by mass of the rubber component is 70% by mass or more, preferably 75% by mass or more, and still more preferably 80% by mass or more. When it is less than 70% by mass, sufficient air shutoff property may not be obtained. The total content may be 100% by mass. However, from a viewpoint of the sheet processability and the air shutoff property, the total property is preferably 95% by mass or less, and more preferably 90% by mass or less.

The content of the reclaimed butyl-based rubber in 100% by mass of the rubber component is preferably 5% by mass or more, and more preferably 8% by mass or more. When it is less than 5% by mass, the merit of using the reclaimed butyl-based rubber may not be obtained sufficiently. The content is preferably 30% by mass or less, and more preferably 25% by mass or less. When it is more than 30% by mass, the air shutoff property and the vulcanization rate may not be secured sufficiently.

From a viewpoint of improving the sheet processability and the air shutoff property in a good balance, the rubber composition constituting the inner liner 7 preferably contains isoprene-based rubber.

Examples of the isoprene-based rubber include natural rubber (NR), epoxidized natural rubber (ENR), and isoprene rubber (IR). In particular, from the viewpoint of improving the sheet processability and the air shutoff property in a good balance, NR or IR is preferable.

The NR is not particularly limited, and, for example, those commonly used in the tire industry such as SIR20, RSS #3, and TSR20 can be used. The IR is not particularly limited, and those commonly used in the tire industry can be used.

The content of the isoprene-based rubber in 100% by mass of the rubber component is preferably 5% by mass or more, and more preferably 10% by mass or more. When it is less than 5% by mass, the sheet processability and the air shutoff property may not be obtained in a good balance. The content is preferably 30% by mass or less, and more preferably 25% by mass or less. When it is more than 30% by mass, the air shutoff property of the vulcanized rubber may not be obtained sufficiently.

In the present embodiment, the rubber component contained the rubber composition constituting the inner liner 7 may contain rubber materials other than the butyl-based rubber and the isoprene-based rubber, as well. Examples thereof include diene-based rubbers such as a butadiene rubber (BR), a styrene-butadiene rubber (SBR), an ethylene-propylene-diene rubber (EPDM), a styrene-isoprene-butadiene rubber (SIBR), a chloroprene rubber (CR), and an acrylonitrile-butadiene rubber (NBR). In the rubber component, one of the above-mentioned rubber materials may be used alone, or two or more of the rubber materials may be used in combination, blended at a predetermined blend ratio.

It is preferable that the rubber composition constituting the inner liner 7 contains a filler. Specific examples of the filler include carbon black, silica, calcium carbonate, talc, alumina, clay, aluminum hydroxide, and mica. Among these, carbon black and silica can be preferably used as a reinforcing agent, and they are preferably used in combination. It is noted that when silica is used, it is preferably used in combination with a silane coupling agent.

The carbon black is not particularly limited, and examples thereof include N134, N110, N220, N234, N219, N339, N330, N326, N351, N550, and N762. These may be used alone or in combination of two or more.

The carbon black may be a commercial product of, for example, Asahi Carbon Co., Ltd., Cabot Japan K.K., Tokai Carbon Co., Ltd., Mitsubishi Chemical Corporation, Lion Corporation, Nippon Steel Chemical Carbon Co., Ltd., or Columbia Carbon.

The content of the carbon black is preferably 1 part by mass or more, more preferably 3 parts by mass or more, and is preferably 50 parts by mass or less, more preferably 30 parts by mass or less, and still more preferably 10 parts by mass or less with respect to 100 parts by mass of the rubber component.

The rubber composition constituting the inner liner 7 preferably contains a plasticizer (softening agent). Examples of the plasticizer include a resin component, oil, a liquid rubber, and an ester plasticizer. These may be used alone or in combination of two or more. In particular, the plasticizer is preferably oil or a resin component.

The oil may be any oil that has been generally used in the tire industry, and examples thereof include process oils, vegetable oils, and mixtures thereof. Examples of the process oil include paraffinic process oil, aromatic process oil, and naphthenic process oil. Examples of the vegetable oil include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combination of two or more. In particular, the process oil is preferable, and the aromatic process oil is more preferable.

The oil may be a commercial product of Idemitsu Kosan Co., Ltd., Sankyo Yuka Kogyo K.K., ENEOS Corporation, Olisoy, H&R, Hokoku Corporation, Showa Shell Sekiyu K.K., and Fuji Kosan Co., Ltd.

In addition, the rubber composition constituting the inner liner 7 preferably contains a resin component as necessary. The resin component can be solid or liquid at normal temperature, and specific examples of resin component include styrene resins, coumarone resins, terpene resins, C5 petroleum resins, C9 petroleum resins, C5C9 petroleum resins, and acrylic resins. These may be used alone or in combination of two or more. The content of the resin component in 100% by mass of the rubber component is preferably more than 2% by mass and less than 45% by mass, and more preferably less than 30% by mass.

The styrene resin is a polymer that comprises a styrene monomer as a constituent monomer, and an example thereof is a polymer that is obtained by polymerizing the styrene monomer as a main component (50% by mass or more).

Specific examples thereof include: monopolymers that are respectively obtained by polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.) individually; a copolymer that is obtained by copolymerizing two or more types of styrene monomers; a styrene monomer; and a copolymer of another monomer that can be copolymerized with the styrene monomer.

Examples of the other monomer include: acrylonitriles such as acrylonitrile and methacrylonitrile; acrylics; unsaturated carboxylic acids such as methacrylic acid; unsaturated carboxylic acid esters such as methyl acrylate and methyl methacrylate; dienes such as chloroprene and butadiene-isoprene; olefins such as 1-buten and 1-pentene; and α,β-unsaturated carboxylic acid such as maleic anhydride or acid anhydride thereof.

As the coumarone resin, coumarone indene resin is preferably used. The coumarone indene resin is a resin that contains coumarone and indene as monomer components constituting the skeleton of the resin (main chain). Examples of the monomer components, other than coumarone and indene, that may be contained in the skeleton include styrene, α-methylstyrene, methylindene, and vinyl toluene.

The content of the coumarone indene resin is, for example, more than 1.0 parts by mass and less than 50.0 parts by mass with respect to 100 parts by mass of the rubber component.

The hydroxy value (OH value) of the coumarone indene resin is, for example, more than 15 mgKOH/g and less than 150 mgKOH/g. It is noted that the OH value indicates an amount of potassium hydroxide, given in milligrams, that is required to neutralize acetic acid combined with a hydroxyl group, when one gram of resin is acetylated, and is measured by potentiometric titration (JIS K 0070:1992).

The softening point of the coumarone indene resin is, for example, higher than 30° C. and lower than 160° C. It is noted that the softening point is a softening point that is measured with a ring and ball softening point measuring device according to JIS K6220-1: 2001 and is a temperature at which a ball has descended.

Examples of the terpene resin include polyterpene, terpene phenol, and aromatic modified terpene resin. Polyterpenes are resins obtained by polymerizing terpene compounds and their hydrogenated products. The terpene compound is a compound that comprises, as a basic skeleton, terpen that is a hydrocarbon represented by a composition of $(C_5H_8)_n$ and an oxygen-containing derivative thereof and is classified into monoterpene ($C_{10}H_{16}$), sesquiterpene ($C_{15}H_{24}$), diterpene ($C_{20}H_{32}$), etc., and examples there of include α-pinene, β-pinene, dipentene, limonene, myrcene, alloocimene, ocimene, α-ferrandrene, α-terpinene, γ-terpinene, terpinolene. 1,8-cineole, 1,4-cineole, α-terpineol, β-terpineol, and γ-terpineol.

Examples of polyterpenes include terpene resins such as α-pinene resins, β-pinene resins, limonene resins, dipentene resins, β-pinene/limonene resins, etc. that are made from the above-mentioned terpene compounds, as well as hydrogenated terpene resins that are obtained by hydrogenating the terpene resins. Examples of the terpene phenol include a resin obtained by copolymerizing the terpene compound and the phenol compound, and a resin obtained by hydrogenating the resin. Specific examples thereof include a resin obtained by condensing the terpene compound, the phenol compound, and formalin. Examples of phenolic compounds include phenol, bisphenol A, cresol, and xylenol. Examples of the aromatic modified terpene resin include a resin obtained by modifying a terpene resin with an aromatic compound, and a resin obtained by hydrogenating the resin. The aromatic compound is not particularly limited as long as it has an aromatic ring. Examples thereof include: phenol compounds such as phenol, alkylphenol, alkoxyphenol, unsaturated hydrocarbon group-containing phenol; naphthol compounds such as naphthol, alkylnaphthol, alkoxynaphthol, unsaturated hydrocarbon group-containing naphthol; styrene derivatives such as styrene, alkylstyrene, alkoxystyrene, and unsaturated hydrocarbon group-containing styrene; coumarone; and indene.

The "C5 petroleum resin" refers to a resin obtained by polymerizing a C5 fraction. Examples of the C5 fraction include petroleum fractions corresponding to carbon numbers 4-5 such as cyclopentadiene, pentene, pentadiene, and isoprene. As the C5 petroleum resin, dicyclopentadiene resin (DCPD resin) is suitably used.

The "C9 petroleum resin" refers to a resin obtained by polymerizing a C9 fraction, and to one obtained by hydrogenating or modifying the resin. Examples of the C9 fraction include petroleum fractions corresponding to carbon numbers 8-10 such as vinyl toluene, alkylstyrene, indene, and methylindene. As specific examples, coumarone indene resin, coumarone resin, indene resin, and aromatic vinyl resin are suitably used. The aromatic vinyl resin is preferably a monopolymer of α-methylstyrene or styrene or a copolymer of α-methylstyrene and styrene, and is more preferably a copolymer of α-methylstyrene and styrene because of being economical, easy to process, and excellent on heat generation. The aromatic vinyl resin may be a commercial product of, for example, Kraton Corporation or Eastman Chemical Company.

The "C5C9 petroleum resin" refers to a resin obtained by copolymerizing the C5 fraction and the C9 fraction, and to one obtained by hydrogenating or modifying the resin. Examples of the C5 fraction and the C9 fraction include the above-mentioned petroleum fractions. The C5C9 petroleum resin may be a commercial product of, for example, Tosoh Corporation or Luhua.

The acrylic resin is not particularly limited, but, for example, a solvent-free acrylic resin may be used.

Examples of the solvent-free acrylic resin include (meth) acrylic resin (polymer) synthesized by a high temperature continuous polymerization method (high temperature continuous mass polymerization method) (the method described in U.S. Pat. No. 4,414,370, Japanese Kokai Publication Sho-59-6207, Japanese Kokoku Publication Hei-05-58005, Japanese Kokai Publication Hei-01-313522 U.S. Pat. No. 5,010,166, Toa Gosei Research Annual Report TREND2000 No. 3 p 42-45, etc.) without using as much as possible a polymerization initiator, a chain transfer agent, an organic solvent and the like as auxiliary materials. In the present disclosure, (meth) acryl means methacryl and acryl.

Examples of the monomer component constituting the acrylic resin include (meth) acrylic acid, (meth) acrylic acid esters (alkyl esters, aryl esters, aralkyl esters, etc.), (meth) acrylamides, and (meth) acrylic acid derivatives such as (meth) acrylamide derivatives.

In addition, as a monomer component constituting the acrylic resin, aromatic vinyl such as styrene, α-methylstyrene, vinyl toluene, vinyl naphthalene, divinyl benzene, trivinyl benzene, or divinyl naphthalene may be used, as well as (meth) acrylic acid or (meth) acrylic acid derivative.

The acrylic resin may be a resin composed only of a (meth) acrylic component, or may be a resin including components other than the (meth) acrylic component. In addition, the acrylic resin may contain a hydroxyl group, a carboxyl group, a silanol group, or the like.

The resin component may be a commercial product of, for example, Maruzen Petrochemical Co., Ltd., Sumitomo Bakelite Co., Ltd., Yashara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries Co., Ltd., or Taoka Chemical Co., Ltd.

The rubber composition constituting the inner liner 7 preferably contains a processing aid. The processing aid may be any processing aid that has been generally used in the tire industry, and examples thereof include: fatty acid metal salt; fatty acid amide; amide ester; silica surface active agent; fatty acid ester; a mixture of fatty add metal salt and amide ester: and a mixture of fatty acid metal salt and fatty acid amide. These may be used alone or in combination of two or more. Among these, fatty acid metal salt, amide ester, and the mixture of fatty acid metal salt and amide ester or fatty add amide are preferable, and the mixture of fatty add metal salt and fatty acid amide is particularly preferable.

The fatty acid constituting the fatty acid metal salt is not particularly limited, but examples thereof include saturated or unsaturated fatty acids (preferably saturated or unsaturated fatty acids having 6 to 28 carbon atoms (more preferably 10 to 25 carbon atoms, and still more preferably 14 to 20 carbon atoms)) such as lauric acid, myristic acid, palmitic acid, stearic acid, oleic acid, linoleic acid, linolenic acid, arachidic acid, behenic acid, and nervonic acid. These may be used alone or two or more thereof may be used in combination. Among these, the saturated fatty acid is preferable, and the saturated fatty acid having 14 to 20 carbon atoms is more preferable.

Examples of a metal constituting the fatty acid metal salt include an alkali metal such as potassium and sodium; an alkaline earth metal such as magnesium, calcium, and barium; zinc; nickel; and molybdenum. Among these, zinc and calcium are preferable, and zinc is more preferable.

The fatty acid amide may be a saturated fatty add amide or an unsaturated fatty acid amide. Examples of the saturated fatty acid amide include: N-(1-oxooctadecyljsarcosine, stearic add amide, and behenic add amide. Examples of the unsaturated fatty add amide include oleic add amide and erucic add amide.

A specific example of the mixture of a fatty add metal salt and a fatty add amide is WB16, manufactured by Struktol, that is a mixture of a fatty add calcium and a fatty add amide.

The content of the processing aid is preferably 0.1 parts by mass or more, more preferably 0.5 parts by mass or more, and still more preferably 1 part by mass or more with respect to 100 parts by mass of the rubber component. In addition, the content is preferably 10 parts by mass or less, and more preferably 5 parts by mass or less.

The stearic acid contained in the rubber composition constituting the inner liner 7 may be a conventionally known one, and examples thereof include commercial products of companies: NOF Corporation, Kao Corporation, FUJIFILM Wako Pure Chemical Corporation, and Chiba Fatty Acid Co., Ltd.

The zinc oxide contained in the rubber composition constituting the inner liner 7 may be a conventionally known one, and examples thereof include commercial products of companies: Mitsui Mining & Smelting, Toho Zinc, HakusuiTech, Seido Chemical Industry, and Sakai Chemical Industry.

The sulfur contained in the rubber composition constituting the inner liner 7 may be any sulfur that has been generally used in the tire industry, and examples thereof include: powdered sulfur, precipitated sulfur, colloidal sulfur, insoluble sulfur, highly dispersible sulfur, and soluble sulfur. These may be used alone or in combination of two or more.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The vulcanization accelerator contained in the rubber composition constituting the inner liner 7 may be any vulcanization accelerator that has been generally used in the tire industry, and examples thereof include: thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, N-oxyethylene-2-benzothiazole sulfonamide, and N,N'-diisopropyl-2-benzothiazole sulfenamide; and guanidine vulcanization accelerators such as diphenylguanidine, diorthotolylguanidine, and orthotolylbiguanidine. These may be used alone or in combination of two or more. In particular, the sulfenamide vulcanization accelerators and the thiuram vulcanization accelerators are preferable, and it is preferable that sulfenamide vulcanization accelerator(s) and thiuram vulcanization accelerator(s) are used in combination.

The vulcanization accelerator may be a commercial product of, for example, Kawaguchi Chemical Industry Co., Ltd., Ouchi Shinko Chemical Industrial Co., Ltd., or Rhein Chemie.

In the present embodiment, the inner liner 7 is composed of a rubber composition whose complex elastic modulus $E^*$ at 70° C. is smaller than that of the rubber composition (first rubber composition) constituting the mount member 10. That is, complex elastic modulus $E^*2$ at 70° C. of the rubber composition constituting the inner liner 7 is smaller than complex elastic modulus $E^*1$ at 70° C. of the rubber composition constituting the mount member 10. The action effect of the configuration is described below.

The bead portions 5 are parts that are coupled with the wheel and fix the tire 1 to the rim 30R by the internal pressure. Each of the bead portions 5 includes a bead core 5A and an apex rubber 5B, wherein the bead core 5A is composed of a plurality of bead wires 5C made of steel. The apex rubber 5B is located outside the bead core 5A in the radial direction D2 and is, for example, made of a rubber composition (vulcanized rubber) having high rigidity. The external side of the bead core 5A and the apex rubber 5B is surrounded by the carcass ply of the carcass 6. Specifically, the carcass ply is folded from inside to outside in the width direction D1 around the bead core 5A, and extends along the outside of the bead portions 5 in the width direction D1 towards the outside in the radial direction D2. The bead core 5A and the apex rubber 5B are disposed in a part that is surrounded in this way by the carcass ply.

The belt portion 8 is a belt-like member extending in the peripheral direction D3 of the tire 1. The belt portion 8 is disposed inside the tread portion 2 in the radial direction D2 and outside the carcass 6. The belt portion 8 has a role of enhancing the synthesis of the tread portion 2 by tightening the carcass 6 in the radial direction D2. The belt portion 8 is also a reinforcing layer for reinforcing the carcass 6 together with the band portion 9 described below.

The belt portion 8 is composed of at least one belt ply 8A. In the present embodiment, the belt portion 8 includes two belt plies 8A. The belt portion 8 extends to make one round of the tire 1 in the peripheral direction D3.

Each of the belt plies 8A includes a large number of belt cords (not shown) that extend in a direction crossing the equator plane CL1 of the tire 1. Each of the belt plies 8A is obtained by covering these belt cords with topping rubber. The large number of belt cords are arranged to align along the peripheral direction D3 of the tire 1 in a state of crossing the equator plane CL1 of the tire 1 at a predetermined angle (for example, an angle in the range of 10 to 35 degrees). In the belt portion 8, each of the belt plies 8A is disposed such that the belt cords are oriented to cross each other. As the belt cords, cords made of steel (steel cords) or the organic fiber cords are used.

The band portion 9 is a belt-like member extending in the peripheral direction D3 of the tire 1. The band portion 9 is disposed inside the tread portion 2 in the radial direction D2 and outside the belt portion 8. The band portion 9 includes a full band 9A and a pair of edge bands 9B, wherein the full band 9A covers the entire belt portion 8, and the pair of edge bands 9B are disposed at positions corresponding to the opposite end parts of the tread portion 2 in the width direction D1. The band portion 9 has a role of restricting the movement of the belt portion 8 to prevent the belt portion 8 from floating up or peeling off by the centrifugal force generated during travelling of the vehicle. In addition, the band portion 9 is also a reinforcing layer for reinforcing the carcass 6 together with the belt portion 8 described above.

FIG. 3A and FIG. 3B are diagrams showing a configuration of the mount member 10. FIG. 3A is a perspective diagram of the mount member 10. FIG. 3B is a partial cross-sectional diagram of the mount member 10.

The mount member 10 is a member to which electric equipment such as a sensor for detecting temperature, vibration, pressure, acceleration or the like is attached. The mount member 10 is fixed to the inner surface 7A of the tire 1, namely, the inner surface 7A of the inner liner 7. Examples of the electric equipment other than the sensor include a relay for relaying a wireless communication or the like, and a transmitter for transmitting a predetermined signal.

As shown in FIG. 3A and FIG. 3B, the mount member 10 includes a mounting seat portion 11 and a main body portion 12, wherein the mounting seat portion 11 is fixed to the inner surface 7A, and the electric equipment is attached to the main body portion 12 in a detachable manner. The mount member 10 is obtained by integrally forming the mounting seat portion 11 and the main body portion 12 from a vulcanized rubber composition (vulcanized rubber). It is noted that a part indicated by a dotted line in FIG. 3B represents the electric equipment attached to the mount member 10.

The mount member 10 is composed of a rubber composition different from that of the inner liner 7. Materials common to those of the rubber composition of the inner liner 7 may be used as materials, other than the rubber component, blended into the rubber composition of the mount member 10. That is, the rubber composition constituting the mount member 10 may include, in addition to the rubber component, additives such as a reinforcing agent such as carbon black or silica, an anti-aging agent, a vulcanization accelerator, and a plasticizer. Of course, the rubber component constituting the mount member 10 may be the same as the rubber component of the inner liner 7, or may be different therefrom. That is, as the rubber component of the mount member 10, one of the above-described rubber materials applicable to the rubber component of the inner liner 7 may be used alone, or two or more of the rubber materials may be used in combination, blended at a predetermined blend ratio. For example, the rubber component of the mount member 10 may be different from that of the inner liner 7, and may be, for example, a rubber component that mainly contains: the butadiene rubber (BR) whose glass transition temperature Tg is low and which is excellent in low-temperature properties; and the acrylonitrile-butadiene rubber (NBR) which is excellent in mechanical properties. In addition, the rubber component of the mount member 10 may further contain other rubber materials such as: the isoprene-based rubber; and the diene-based rubber such as a styrene-butadiene rubber (SBR), a styrene-isoprene rubber, a styrene-isoprene-butadiene rubber (SIBR), and a chloroprene rubber (CR). Of course, the mount member 10 may be composed of the same rubber component as that of the inner liner 7. It is noted that for the materials common to those of the inner liner 7, refer to explanations that have already been given above.

The mounting seat portion 11 is formed, for example, in a disk shape, and is formed such that its outer diameter is larger than the outer diameter of the main body portion 12. In addition, the main body portion 12 is formed in a shape of a cylinder projecting from one of disk surfaces of the mounting seat portion 11. An opening 13 is formed in a projection end surface of the main body portion 12, and the electric equipment is fitted into the main body portion 12 through the opening 13 to be held therein by the elasticity of the rubber. As the method for mounting the mounting seat portion 11 to the inner surface 7A of the tire 1, various methods can be adopted.

For example, in a possible mounting method, a skin of a mounting area A1 (mounting surface) of the inner surface 7A is removed by applying a predetermined surface processing treatment to the mounting area A1, and in that state, the mounting seat portion 11 of the mount member 10 is fixed to the mounting area A1 by being welded or adhered with an adhesive. Examples of the surface processing treatment include: a treatment of removing the mold releasing agent together with the skin by polishing the surface of the mounting area A1 of the inner surface 7A with a polishing machine; and a treatment of removing the mold releasing agent together with the skin of the surface of the mounting area A1 by irradiating a laser beam onto the surface of the mounting area A1.

In more detail, the surface processing treatment is a treatment to process and make the surface of the mounting area A1 an even surface (for example, a flat surface) by polishing with a polishing machine or irradiation of the laser beam. This improves the adhesion between the mounting area A1 and the contact surface of the mounting seat portion 11, and enhances the mounting strength of the mount member at the mounting area A1. In addition, since it also removes the mold releasing agent adhered to the mounting area A1, a strength reduction due to the mold releasing agent is prevented. As a result, the mount member 10 is more stiffly mounted to the mounting area A1.

It is noted that, before the mount member 10 is mounted, the surface processing treatment of polishing with a polishing machine or irradiation of the laser beam is preferable to be applied to an adhesion surface of the mounting seat portion 11, too. This further improves the adhesion between the adhesion surface of the mounting seat portion 11 and the mounting area A1, and further enhances the mounting strength of the mount member 10.

In addition, other examples of the method for mounting the mounting seat portion 11 include: a mounting method to vulcanize the tire 1 without applying the mold releasing agent to the mounting area A1, and then fix the mounting seat portion 11 to the mounting area A1 by welding or adhering with an adhesive; and a mounting method to join the mounting seat portion 11 to the inner surface 7A of the tire 1 before vulcanization, and then fixes the mount member 10 to the inner surface 7A by vulcanizing the tire 1 together with the mount member 10.

Here, if the fixation of the mount member 10 is not sufficient, the mounting seat portion 11 of the mount member 10 may partially peel off while the vehicle is travelling and the peeled-off part may come in contact with the inner surface 7A along with rolling of the tire 1, causing the contact sound to be sensed as an unpleasant noise. For this reason, as the surface processing treatment, a processing treatment with laser beam irradiation is preferable since it can uniformly process the surface of the mounting area A1 or the contact surface of the mounting seat portion 11 with high precision. In addition, according to the processing treatment with laser beam irradiation, a step at a boundary between a part where the treatment has been performed (surface-processed surface) and a part where the treatment has not been performed (untreated surface) can be 200 µm or less, causing a less amount of skin to be scraped than a processing treatment with polishing. It is noted that it is possible to determine whether or not the surface processing treatment with laser beam irradiation has been performed by confirming whether or not the step at the boundary between a part where the surface processing treatment has been performed (surface-processed surface) and a part where the surface processing treatment has not been performed (untreated surface) is 200 µm or less. That is, when the step at the boundary is 200 µm or less, it is determined that the surface processing treatment with laser beam irradiation has been performed; and when the step at the boundary is more than 200 µm, it is determined that another surface processing treatment has been performed.

The mount member 10 may be made of any material that has sufficient elasticity to hold the electronic equipment, and complex elastic modulus E* at 70° C. of the rubber composition of the mount member 10 is preferably, for example, 4.5 MPa.

In the present embodiment, as shown in FIG. 2, the mount member 10 is disposed on the inner surface 7A of the tire 1 at a position corresponding to a center part of the tread portion 2 in the width direction D1. In other words, the mount member 10 is disposed on the inner surface 7A of the tire 1 at a position corresponding to the above-described crown land portion 24A. Specifically, the mount member 10 is disposed on the inner surface 7A at the mounting area A1 (mounting position) corresponding to the above-described crown land portion 24A.

The mounting area A1 is an area in the inner surface 7A that is divided by two straight lines L1 that respectively pass through opposite ends of a ground contact surface of the crown land portion 24A in the width direction D1, and are perpendicular to a tread surface profile that is obtained by imaginarily connecting the surface of the crown land portion 24A. In other words, the mounting area A1 is an area in a rear surface (a surface on the inner side) of the tread portion 2, the area being surrounded by two crossing portions P1 where the two straight lines L1 that are parallel to the equator plane CL1 cross the inner surface 7A. It is noted that the straight lines L1 respectively pass through opposite ends of the crown land portion 24A in the width direction D1 and are parallel to the equator plane CL1. Here, the position corresponding to the crown land portion 24A means a position that is disposed such that the center of the mounting seat portion 11 of the mount member 10 is located in the mounting area A1, and is not limited to a position where a straight line (a straight line included in the equator plane CL1) passing through the center of the crown land portion 24A coincides with the center of the mount member 10.

It is noted that the mounting area A1 may correspond to both or either of the two middle land portions 24B. In this case, the mounting area A1 is an area in the inner surface 7A that is divided by two straight lines L2 that pass through the opposite ends of the ground contact surface of the middle land portion 24B in the width direction D1, and are perpendicular to a tread surface profile that is obtained by imaginarily connecting the surface of the middle land portion 24B. In addition, the mounting area A1 may correspond to both or either of the two shoulder land portions 24C. In this case, the mounting area A1 is an area in the inner surface 7A that is divided by a straight line L31 and a straight line L32, wherein the straight line L31 passes through an end of the ground contact surface of the tread surface 21, and the straight line L32 passes through an end of the shoulder land portion 24C on the side of the second main groove 22B and is perpendicular to the tread surface profile.

In the present embodiment, the mount member 10 is disposed at a position where a straight line (a straight line included in the equator plane CL1) that passes through the center of the crown land portion 24A coincides with the center of the mount member 10. More specifically, the mount member 10 is fixed to the inner surface 7A such that the center of the mounting seat portion 11 coincides with an intersection of: a straight line (a straight line included in the equator plane CL1) that passes through the center of the crown land portion 24A and the center of the tire 1 in the cross-sectional diagram of FIG. 2; and the inner surface 7A. Accordingly, the mount member 10 is not disposed at a position on the inner surface 7A that corresponds to the main grooves 22 formed on the tread portion 2. That is, the mount member 10 is not mounted at a position on the tread portion 2 that is in the rear of the main grooves 22.

In addition, the center of the mounting seat portion 11 is preferably within an area divided by straight lines that are perpendicular to the tread surface profile at positions of, with the equator plane CL1 as its center, 50% of the ground contact width of the ground contact surface of the tread portion 2. This is because it is considered that when the area is more outside than the positions of 50% in the width direction D1, a deformation amount of the tread portion 2 during rolling is large, and a vibration sound made by the mount member 10 becomes large.

Here, the tread surface profile is a surface shape that can be obtained by imaginarily connecting the surfaces of the land portions 24 in the normal state.

In addition, the ground contact width is the maximum position of the ground contact surface in the width direction that is obtained when the tire 1 is pressed against a flat road surface in a state of the normal inner pressure, normal load, and camper angle of 0 (zero) degrees.

It is noted that the normal load is a load specified by the standard on which the tire 1 is based. Specifically, the normal load is the "maximum load capacity" specified by the JATMA standard, the "maximum value" specified by the TRA standard in "Tire load limits at various cold inflation pressures", and the "load capacity" specified by the ETRTO standard.

It is noted that although in the present embodiment, the mount member 10 including the mounting seat portion 11 is described, the mount member 10 may not include the mounting seat portion 11, but may be composed of only the main body portion 12.

In addition, when a plurality of mount members 10 are mounted to the inner surface 7A of the tire 1, the mount members 10 are preferably arranged on the inner surface 7A at equal intervals along the peripheral direction D3. This makes it possible to keep the weight balance in the peripheral direction D3 equal when a plurality of mount members 10 are installed.

In addition, the mounting position of the mount member 10 is not limited to the mounting area A1. For example, the mount member 10 may be mounted to a position on the inner surface 7A of the tire 1 that corresponds to one of the two middle land portions 24B. In addition, the mount member 10 may be mounted to a position that corresponds to both of the two middle land portions 24B.

In addition, when two or more mount members 10 are mounted to the inner surface 7A in alignment in the width direction D1, they are preferably mounted to positions that correspond to both of the two middle land portions 24B that are disposed at equal intervals in the width direction D1 from the equator plane CL1 of the tire 1 in between. In this case, when the crown land portion 24A is present on the equator plane CL1, the mount members 10 may be mounted to positions corresponding to the crown land portion 24A. This makes it possible to keep the weight balance in the width direction D1 symmetrical to the equator plane CL1 and equal.

The mount member 10 may have any shape as far as it can be attached with the electric equipment, and, for example, may be formed as shown in FIG. 4A and FIG. 4B. Here, FIG. 4A and FIG. 4B are diagrams showing another configuration of the mount member 10. FIG. 4A is a perspective diagram of the mount member 10. FIG. 4B is a partial cross-sectional diagram of the mount member 10. The mount member 10 shown in FIG. 4A and FIG. 4B includes an annular and circular mounting seat portion 11A and a cylindrical main body portion 12A whose inner hole continues to an opening 13A of the mounting seat portion 11A. The other side of the main body portion 12A is closed. As a result, when the mounting seat portion 11A is fixed to the inner surface 7A in a state where the electric equipment is held in the main body portion 12A, the electric equipment is in a sealed state, shielded from outside.

Meanwhile, in a case where the mount member 10 attached with the electric equipment is installed on the inner surface 7A of the tire 1, during travelling of a vehicle, a vibration transmitted from the road surface to the tire 1 may propagate in the tread portion 2 and be transmitted to the mount member 10 and the electric equipment, causing the electric equipment to vibrate inside the tire 1. In addition, the mount member 10 periodically abuts on the road surface via the tread portion 2 each time the tire 1 makes one round, and a load of the mount member 10 and the electric equipment is periodically applied to the road surface via the tread portion 2. This may cause a periodical vibration of the tread portion 2. Both the vibration transmitted from the tread portion 2 to the mount member 10 and the electric equipment, and the vibration transmitted from the mount member 10 and the electric equipment to the tread portion 2, cause noise during travelling of the vehicle. There is a concern that these vibration sounds may be sensed as an unpleasant noise by a passenger of the vehicle. Such vibrations remarkably appear during high-speed travelling of the vehicle.

On the other hand, in the present embodiment, taking into consideration that the temperature inside the tire 1 during high-speed travelling on a dry road surface reaches approximately 70° C., the mount member 10 is composed of a rubber composition having a larger complex elastic modulus $E^*$ at 70° C. than the rubber composition constituting the inner liner 7. That is, complex elastic modulus $E^*1$ at 70° C. of the rubber composition constituting the mount member 10 is larger than complex elastic modulus $E^*2$ at 70° C. of the rubber composition constituting the inner liner 7. In other words, complex elastic modulus $E^*1$ of the mount member 10 and complex elastic modulus $E^*2$ of the inner liner 7 have a relationship represented as $E^*1-E^*2>0$.

In the present embodiment, as described above, it is preferable that complex elastic modulus $E^*1$ at 70° C. of the rubber composition constituting the mount member 10 is larger than complex elastic modulus $E^*2$ at 70° C. of the rubber composition constituting the inner liner 7. For this reason, the inner liner 7 may be a viscoelastic material softer than the mount member 10. It is considered that with this configuration, in the tire 1 attached with the electric equipment, the vibration transmitted from the tread portion 2 to the mount member 10 and the electric equipment during travelling of the vehicle is attenuated by the inner liner 7, and the vibration transmitted from the mount member 10 and the electric equipment to the tread portion 2 is attenuated by the inner liner 7.

As a result, it is possible to restrict a noise caused by the load of the mount member 10 and the electric equipment during travelling of the vehicle. In particular, it is possible to effectively restrict a noise from occurring during travelling of the vehicle at a high speed exceeding 80 km/h. In addition, since the vibration due the load of the mount member 10 and the electric equipment can be restricted, it is also possible to improve the vehicle running stability.

It is noted that the complex elastic moduli $E^*1$ and $E^*2$ are measurement values measured on the test pieces of the mount member 10 and the inner liner 7 by a predetermined viscoelastic spectrometer (viscoelasticity measuring device), and, for example, can be measured under measurement conditions: measurement temperature of 70° C., initial strain of 5%, dynamic strain of ±1%, frequency of 10 Hz, and stretch deformation mode.

Here, a difference $\Delta E^*$ ($=E^*1-E^*2$) between complex elastic modulus $E^*1$ at 70° C. of the mount member 10 and complex elastic modulus $E^*2$ at 70° C. of the inner liner 7 is preferably less than 2.5 MPa. When the inner liner 7 is excessively soft with respect to the mount member 10, the vibration transmitted from the tread portion 2 may not be attenuated at the inner liner 7 or may be, on the contrary, amplified. In this case, the noise may be increased. In addition, the mount member 10 and the electric equipment may be failed due to the vibration. For this reason, the difference $\Delta E^*$ is preferably within a range of producing an effect of restricting the noise during travelling of the vehicle, specifically less than 2.5 MPa.

In general, the complex elastic moduli $E^*1$ and $E^*2$ can be adjusted by changing the type or blend amount of the rubber component, the type, shape, or blend amount of the filler (reinforcing agent) such as carbon black or silica, or the type or blend amount of other additives. In the present embodiment, too, it is possible to let the relationship $E^*1-E^*2>0$ be satisfied by appropriately changing the type or blend amount of each material constituting each rubber composition of the inner liner 7 and the mount member 10, or the type or shape of the reinforcing agent.

It is noted that in the tire 1 of the present embodiment, loss tangent tan δ (=E"/E') at 70° C. of the rubber composition constituting the inner liner 7 is preferably 0.26 or less. Hereinafter, loss tangent tan δ at 70° C. of the inner liner 7 is denoted as tan δ·70° C.

In addition, loss tangent tan δ·70° C. at 70° C. of the rubber composition constituting the inner liner 7 is more preferably 0.13 or less. The lower limit value of the loss tangent tan δ·70° C. of the inner liner 7 is not limited, and the lower the value is, the more preferable it is.

It is noted that the loss tangent tan δ·70° C. is a measurement value measured on the test pieces of the mount member 10 and the inner liner 7 by a predetermined viscoelastic spectrometer (viscoelasticity measuring device), and, for example, can be measured under measurement conditions: measurement temperature of 70° C., initial strain of 10%, dynamic strain of ±2%, frequency of 10 Hz, and stretch deformation mode.

In general, the loss tangent tan δ can be adjusted by changing the type or shape of blended reinforcing agent or blend amount thereof. In addition, it can be adjusted by changing the blend amount of the plasticizer such as oil. In the present embodiment, too, it is possible to adjust the loss tangent tan δ·70° C. to arbitrary values by appropriately changing the type or blend ratio of each material constituting each rubber composition of the inner liner 7 and the mount member 10, as well as the type or shape, or the blend amount of the reinforcing agent, or the blend amount of the plasticizer.

To attenuate the vibration or the like at the inner liner 7, thickness d (see FIG. 2) from the inner surface of the carcass 6 to the inner surface of the inner liner 7 is preferably 0.6 mm or more. In a case where some intervening member such as an insulation layer is provided between the carcass 6 and the inner liner 7, the thickness d is obtained by adding the thickness of the intervening member and the thickness of the inner liner 7. In addition, when the intervening member is not provided, the thickness d is the thickness of the inner liner 7. The minimum thickness of the thickness d is 0.6 mm. The thickness d for a regular pneumatic tire can be determined based on the type of the inner liner 7, the purpose or type of the pneumatic tire, or the like. When the thickness d is excessively small, sufficient attenuation is not obtained. As a result, as described above, the thickness d is preferably 0.6 mm or more. It is noted that although the upper-limit value of the thickness d is not particularly limited, it may be the upper-limit value in a general range (1.0 mm for a passenger car, 2.0 mm for a large-sized vehicle).

In particular, in the present embodiment, as described above, loss tangent tan δ·70° C. of the inner liner 7 is preferably 0.26 or less, and more preferably 0.13 or less. With this configuration, it is possible to restrict the heating of the inner liner 7 by reducing lost elastic modulus E" (viscosity item) with respect to storage elastic modulus E' (elastic item) in the rubber composition of the inner liner 7. This causes the inner liner 7 to be hard to get soft and thus restricts the vibration of the inner liner 7, thereby causing the noise to hardly occur during travelling of the vehicle. In addition, since the inner liner 7 becomes hard to get soft, the thickness of the inner liner 7 can be easily adjusted to increase in size.

In the tire 1 of the present embodiment, the thickness of the inner liner 7 is 0.6 mm or more due to the configuration where the inner liner 7 is bonded to the inner surface of the carcass 6. However, for example, when another rubber layer is provided between the inner surface of the carcass 6 and the inner liner 7, it is preferable that thicknesses of the other rubber layer and the inner liner 7 are respectively adjusted so that the thickness from the inner surface of the carcass 6 to the inner surface 7A of the inner liner 7 is 0.6 mm or more.

In addition, glass transition temperature T1 of the rubber composition constituting the mount member 10 is preferably lower than glass transition temperature T2 of the rubber composition constituting the inner liner 7. That is, the glass transition temperature T1 of the mount member 10 and the glass transition temperature T2 of the inner liner 7 have a relationship represented as T2−T1>0.

In the tire 1 of the present embodiment, difference ΔT (=T2−T1) between the glass transition temperature T2 of the inner liner 7 and the glass transition temperature T1 of the mount member 10 is preferably in a range from more than 0° C. to 20° C. or less, and more preferably in a range from 2° C. or more to 4° C. or less. For example, when the glass transition temperature T1 of the mount member 10 is −22° C., the glass transition temperature T2 of the inner liner 7 is preferably in a range from −20° C. to −18° C.

The glass transition temperature Tg of a general inner liner is approximately −60° C., whereas in the present embodiment, the glass transition temperature T2 of the inner liner 7 is higher than the normal value (−60° C.). For this reason, in the present embodiment, the glass transition temperature T1 of the mount member 10 is lower than the glass transition temperature T2 of the inner liner 7. As a result, according to the present embodiment, when the temperature of the tire has increased to approximately 70° C. during travelling of the vehicle, the inner liner 7 is more difficult to get soft than the mount member 10, and the vibration of the inner liner 7 is restricted. With this configuration, it is possible to further restrict a noise from occurring during the rotation of the tire 1.

In general, the glass transition temperatures T1 and T2 can be adjusted by changing the type or blend amount of the rubber material being blended, or by changing the reinforcing agent. In the present embodiment, too, it is possible to adjust the glass transition temperatures T1 and T2 to arbitrary values by changing the blend amount of the reinforcing agent.

In addition, in the present embodiment, as described above, the mount member 10 is fixed to the mounting area A1. With this configuration, when the tire 1 rotates while the vehicle is travelling, most of the force that is generated by the rotation of the tire 1 and the weight of the mount member 10 and the electronic component, acts on the crown land portion 24A. With this configuration, the unpleasant noise due to the load of the mount member 10 and the electronic component occurs only from the crown land portion 24A, and as a result, the noise due to the load is restricted.

If the mount member 10 is installed on the inner surface 7A at a position corresponding to the main groove 22, the load would act on each of the two land portions 24 located on both sides of the main groove 22 in the width direction D1. In this case, a noise due to the load is generated from each of the land portions 24, and the sound waves of each noise are synthesized and a higher beat sound may occur. On the other hand, in the tire 1 of the present embodiment, the mount member 10 is fixed to the mounting area A1, and such a noise does not occur.

To effectively restrict the noise, the mount member 10 is preferably installed within the above-described range of the mounting area A1. However, when the mounting seat portion 11 is a plate-like member formed in a disk shape, and the volume of the mounting seat portion 11 is small enough in comparison with the main body portion 12, the influence given by the mounting seat portion 11 to the noise is small. As a result, in this case, at least the main body portion 12 may be disposed in a range of the mounting area A1.

The tire 1 according to an embodiment of the present disclosure has been described up to now. However, the present disclosure is not limited to the above-described embodiment. The following describes examples of the tire 1 of the present embodiment and comparative examples, with reference to Tables 1 to 3.

EXAMPLES

In Examples 1 to 17 and Comparative Examples 1 to 5 described in the following, the tires are pneumatic tires similar to the tire 1 described above, and the blend ratios of each material constituting the rubber compositions of parts, except for the inner liner 7 and the mount member 10, are substantially the same.

The various blend materials used in the rubber compositions constituting the inner liner 7 and the mount member 10 are as follows.
(1) Rubber Materials
  (a) IIR: Bromobutyl 2222 manufactured by Exxon Mobil Corporation
(2) Additives
  (a) Reinforcing agent (carbon black): DIABLACK N220 manufactured by Mitsubishi Chemical Corporation
  (b) Oil: Process X-260 manufactured by ENEOS Corporation
  (c) Resin A1: YS RESIN PX1150N manufactured by Yasuhara Chemical Co., Ltd.
  (d) Resin A2: SYLVATRAXX 4401 (α-methylstyrene resin) manufactured by Arizona Chemical Company, LLC
  (e) Processing aid: PROMIX 400 manufactured by Flow Polymers
  (f) Stearic acid: camellia oil manufactured by NOF Corporation
  (g) Zinc oxide: two types of zinc oxides manufactured by Mitsui Mining & Smelting Co., Ltd.
  (h) Vulcanization accelerator 1: NOCCELER CZ-G (CBS) manufactured by Ouchi Shinko Chemical Industrial Co., Ltd.

In addition, the tires of Examples 1 to 17 and Comparative Examples 1 to 5 each have the same configuration as the above-described tire 1. That is, the mount member 10 is mounted to the mounting area A1 on the inner surface 7A corresponding to the crown land portion 24A.

Table 1 shows blend information R1 to R15 of the inner liner 7 and blend information R21, R22 of the mount member 10 in each tire of Examples 1 to 17 and Comparative Examples 1 to 5. Each of the blend information R1 to R15, R21, and R22 includes blend ratios of rubber compositions and predetermined physical property values of the corresponding members.

TABLE 1

|  |  | Blend information of inner liner |  |  |  |  |  |  |  |  |  |  |  |  |  |  | Blend information of mount member |  |
|---|---|---|---|---|---|---|---|---|---|---|---|---|---|---|---|---|---|---|
|  |  | R1 | R2 | R3 | R4 | R5 | R6 | R7 | R8 | R9 | R10 | R11 | R12 | R13 | R14 | R15 | R21 | R22 |
| Rubber material | IIR | 100 | 100 | 100 | 100 | 100 | 100 | 100 | 100 | 100 | 100 | 100 | 100 | 100 | 100 | 100 | 0 | 100 |
|  | BR | 0 | 0 | 0 | 0 | 0 | 0 | 0 | 0 | 0 | 0 | 0 | 0 | 0 | 0 | 0 | 50 | 0 |
|  | NBR | 0 | 0 | 0 | 0 | 0 | 0 | 0 | 0 | 0 | 0 | 0 | 0 | 0 | 0 | 0 | 50 | 0 |
| Additive | Reinforcing agent | 70 | 65 | 40 | 40 | 60 | 60 | 50 | 50 | 40 | 40 | 30 | 25 | 35 | 30 | 30 | 30 | 40 |
|  | Oil | 5 | 5 | 0 | 0 | 7 | 7 | 5 | 5 | 5 | 5 | 5 | 6 | 2 | 0 | 0 | 7 | 3 |
|  | Resin A1 | 5 | 5 | 3 | 0 | 5 | 0 | 5 | 0 | 5 | 0 | 0 | 0 | 0 | 0 | 0 | 1 | 0 |
|  | Resin A2 | 0 | 0 | 0 | 3 | 0 | 3 | 0 | 4 | 0 | 5 | 5 | 5 | 8 | 15 | 16 | 0 | 3 |
|  | Processing aid | 2 | 2 | 2 | 2 | 2 | 2 | 2 | 2 | 2 | 2 | 2 | 2 | 2 | 2 | 2 | 1 | 2 |
|  | Stearic acid | 1 | 1 | 1 | 1 | 1 | 1 | 1 | 1 | 1 | 1 | 1 | 1 | 1 | 1 | 1 | 2 | 1 |
|  | Zinc oxide | 1 | 1 | 3 | 3 | 1 | 1 | 1 | 1 | 1 | 1 | 1 | 1 | 1 | 1 | 1 | 3 | 3 |
|  | Sulfur | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 2.0 | 0.6 |
|  | Vulcanization accelerator | 1 | 1 | 1 | 1 | 1 | 1 | 1 | 1 | 1 | 1 | 1 | 1 | 1 | 1 | 1 | 1 | 1 |
| Physical property | E* (70° C.) | 7.0 | 5.0 | 6.0 | 6.0 | 4.0 | 4.0 | 3.5 | 3.5 | 3.0 | 3.0 | 2.5 | 2.0 | 3.0 | 3.0 | 2.8 | 4.5 | 4.5 |
|  | tan δ-70° C. | 0.28 | 0.24 | 0.13 | 0.14 | 0.26 | 0.26 | 0.20 | 0.20 | 0.13 | 0.13 | 0.14 | 0.14 | 0.13 | 0.13 | 0.13 | 0.15 | 0.15 |
|  | E* (0° C.) | 35.0 | 27.0 | 29.0 | 29.0 | 20.0 | 20.0 | 15.0 | 15.0 | 13.0 | 13.0 | 10.0 | 10.0 | 13.0 | 13.0 | 11.0 | 25.0 | 25.0 |
|  | tan δ-0° C. | 1.00 | 0.90 | 0.45 | 0.45 | 0.90 | 0.90 | 0.70 | 0.70 | 0.46 | 0.45 | 0.40 | 0.40 | 0.63 | 0.65 | 0.67 | 0.40 | 0.43 |
|  | Tg(° C.) | 30 | 28 | 26 | 20 | 25 | 21 | 24 | 19 | 23 | 18 | 18 | 18 | 12 | 2 | 1 | 22 | 22 |

As shown in Table 1, each of the blend information R1 to R15, R21, and R22 shows blend ratios of three types of rubber materials, blend ratios of nine types of additives, and physical property values of five physical properties. Here, the blend ratio represents, by parts by mass, the blend amount of each material (rubber materials and additives). Specifically, the blend ratio of each material indicates a ratio of the blend amount (parts by mass) of each material when the total parts by mass of the rubber component composed of one or more types of rubber materials is assumed to be 100. The unit of the blend ratio is represented by phr (per hundred rubber). In addition, the physical properties shown in Table 1 are divided into five types: complex elastic modulus E* at 70° C., loss tangent tan δ·70° C. at 70° C., complex elastic modulus E* at 0° C.; loss tangent tan δ·0° C. at 0° C.; and glass transition temperature Tg.

The tires of the examples and the comparative examples were manufactured as follows. First, the additives and the rubber materials other than sulfur and the vulcanization accelerators were blended in accordance with the ratios shown in blend information R1 to R15 of Table 1, and were kneaded for four minutes using a predetermined mixer under the temperature condition of approximately 130° C. Next, sulfur and the vulcanization accelerators were added to the obtained kneaded material in accordance with the ratios shown in Table 1 and kneaded, thereby obtaining unvulcanized rubber compositions. The unvulcanized rubber compositions thus obtained were extended and wound around drums or the like to form sheet-like members for the inner liners 7. These sheet-like members were adhered to a tire molding machine as the inner liners 7, and they were bonded to the tread portions 2 and the other tire members to form unvulcanized tires. The unvulcanized tires were press-vulcanized for 10 minutes under the temperature condition of 170° C., thereby manufacturing test tires (tire size: 205/55R16 91V, maximum load capacity: 615 kg).

In addition, the mount members 10 included in the tires of the examples and the comparative examples were manufactured as follows. First, the additives and the rubber materials other than sulfur and the vulcanization accelerators were blended in accordance with the ratios shown in blend information R21 or R22 of Table 1, and were kneaded for four minutes using a predetermined mixer under the temperature condition of approximately 130° C. Next, sulfur and the vulcanization accelerators were added to the obtained kneaded materials in accordance with the ratios shown in Table 1, and were kneaded for four minutes under the temperature condition of approximately 80° C., thereby obtaining unvulcanized rubber compositions. The unvulcanized rubber compositions thus obtained were extruded and molded in a shape of the mount member 10, and they were vulcanized for 10 minutes under the temperature condition of 170° C., thereby manufacturing the mount members 10.

The manufactured mount members 10 are fixed to the inner surfaces of the tires of the examples and the comparative examples together with the electric equipment by the above-described mounting method. It is noted that the weight of each obtained tire, including the weight of the electric equipment and the mount member 10, was in the range of 7.7 kg±0.2 kg.

It is noted that the values of complex elastic modulus E* and loss tangent tan δ shown in Table 1 were obtained by preparing test pieces having the same configuration as the rubber composition of the inner liner 7 and test pieces having the same configuration as the rubber composition of the mount member 10, and performing a measurement on each of the test pieces as follows. The size of each test piece was 20 mm in long side, 4 mm in width, and 1 mm in thickness. It is noted that the test pieces of the inner liner 7 may be sample pieces of the rubber composition that are cut out from the test tires. With regard to the size of each test piece, the long side corresponds to the peripheral direction D3 (see FIG. 1) of the tire, and the thickness corresponds to the thickness direction of the tire. The complex elastic modulus E* and the loss tangent tan δ of the test pieces of the inner liner 7 and the mount member 10 were measured by using "Eplexor (registered trademark)", a viscoelasticity measuring device manufactured by GABO (Germany). The values of the complex elastic moduli E* were obtained by performing the measurements in the temperature environment of measurement temperature of 0° C. or 70° C., under measurement conditions: initial strain of 5%, dynamic strain of ±1%, frequency of 10 Hz, and stretch deformation mode. In addition, the values of the loss tangent tan δ were obtained by performing the measurements in the temperature environment of measurement temperature of 0° C. or 70° C., under measurement conditions: initial strain of 10%, dynamic strain of ±2.5%, frequency of 10 Hz, and stretch deformation mode. It is noted that when measurements were performed on the same rubber composition, an average value of a plurality of measurements was calculated and written.

In addition, the values of glass transition temperature Tg shown in Table 1 were obtained by preparing test pieces having the same configuration as the rubber composition of the inner liner 7 and test pieces having the same configuration as the rubber composition of the mount member 10, and performing a measurement on each of the test pieces as follows. With regard to each of the test pieces of the inner liner 7 and the mount member 10, loss tangent tan δ was measured for each temperature in a predetermined measurement temperature range by using "Eplexor (registered trademark)", a viscoelasticity measuring device manufactured by GABO (Germany), under measurement conditions: frequency of 10 Hz, initial strain of 10%, amplitude of ±0.5%, and temperature rising speed of 2° C./min, and a temperature distribution curve of the measured values of loss tangent tan δ for which the temperature during the measurement is a variable, was obtained. And a peak temperature corresponding to a peak position (a position at which the measured value of the loss tangent tan δ is the largest) in the obtained temperature distribution curve was determined as the glass transition temperature Tg. It is noted that the measurement temperature range was a temperature range from −60° C. to 40° C.

Table 2 shows the blend information of the inner liner 7 and the mount member 10, the difference ΔE* (=E*1−E*2) between the complex elastic moduli E* of the inner liner 7 and the mount member 10, loss tangent·70° C. of the rubber composition of the inner liner 7, the thickness d including the thickness of the inner liner 7, thickness of the mount member 10, difference ΔT (=T2−T1) of glass transition temperature, and evaluation values of noise during travelling of the vehicle (hereinafter referred to as noise evaluation values), in the respective tires of Examples 1 to 6 and Comparative Examples 1 to 5. In each of the examples and comparative examples, the thickness of the mount member 10 was 6.0 mm.

TABLE 2

| | Part | Blend | ΔE* | tan δ-70° C. | Thickness d (mm) | ΔT | Noise evaluation value |
|---|---|---|---|---|---|---|---|
| Example 1 | Inner liner | R5 | +0.5 | 0.26 | 0.4 | −3.0 | 102 |
| | Mount member | R21 | | | | | |
| Comparative Example 1 | Inner liner | R1 | −2.5 | 0.28 | 0.4 | −8.0 | 82 |
| | Mount member | R21 | | | | | |
| Comparative Example 2 | Inner liner | R2 | −0.5 | 0.24 | 0.4 | −6.0 | 88 |
| | Mount member | R21 | | | | | |
| Comparative Example 3 | Inner liner | R3 | −1.5 | 0.13 | 0.4 | −4.0 | 92 |
| | Mount member | R21 | | | | | |
| Comparative Example 4 | Inner liner | R3 | −1.5 | 0.13 | 0.6 | −4.0 | 88 |
| | Mount member | R21 | | | | | |
| Comparative Example 5 | Inner liner | R4 | −1.5 | 0.14 | 0.6 | 2.0 | 100 |
| | Mount member | R21 | | | | | |
| Example 2 | Inner liner | R7 | +1.0 | 0.20 | 0.4 | −2.0 | 124 |
| | Mount member | R21 | | | | | |
| Example 3 | Inner liner | R9 | +1.5 | 0.13 | 0.4 | −1.0 | 132 |
| | Mount member | R21 | | | | | |
| Example 4 | Inner liner | R5 | +0.5 | 0.26 | 0.4 | −3.0 | 102 |
| | Mount member | R22 | | | | | |
| Example 5 | Inner liner | R7 | +1.0 | 0.20 | 0.4 | −2.0 | 124 |
| | Mount member | R22 | | | | | |
| Example 6 | Inner liner | R9 | +1.5 | 0.13 | 0.4 | −1.0 | 132 |
| | Mount member | R22 | | | | | |

It is noted that the noise evaluation values shown in Table 2 were calculated by the following method. The tires of the examples and the comparative examples were mounted on all wheels of a four-wheel vehicle so that the tires were in the normal state, the vehicle was circulated on a test course at the speed of 100 km/h, and the driver evaluated the noise that the driver sensed in the vehicle by a 10-grade evaluation with evaluation points 1 to 10. The test was conducted in a similar manner by 10 drivers, the evaluation points of the drivers were totaled, and with the total evaluation points of Example 1 being assumed to be 100, the total evaluation points of the other examples and comparative examples were indexed. It is noted that when the noise evaluation value is higher, it indicates that the noise sensed by the driver during high-speed travelling was smaller and that it was more excellent. As shown in Table 2, in Example 1, the difference ΔE* is plus. That is, the complex elastic modulus E*1 of the mount member 10 is larger than the complex elastic modulus E*2 of the inner liner 7. On the other hand, in Comparative Examples 1 to 5, the difference ΔE* is minus. That is, the complex elastic modulus E*1 of the mount member 10 is smaller than the complex elastic modulus E*2 of the inner liner 7. A comparison between Example 1 and Comparative Examples 1 to 5 shows that the noise evaluation value of Example 1 is higher than that of any one of Comparative Examples 1 to 5 although there are some differences in items other than the difference ΔE*. That is, the tire of Example 1 generates lower noise than the tire of any one of Comparative Examples 1 to 5 during travelling of the vehicle. It is understood that this is because the difference ΔE* in Example 1 is plus, namely because the complex elastic modulus E*1 of the mount member 10 is larger than the complex elastic modulus E*2 of the inner liner 7.

In addition, Example 2 is larger in the difference ΔE* and smaller in the loss tangent tan δ·70° C. than Example 1. From this, it is understood that the noise evaluation value of Example 2 is higher than that of Example 1, and the tire of Example 2 generates lower noise than the tire of Example 1 during travelling of the vehicle. It is noted that since values of the difference ΔT in Examples 1 and 2 are both minus, the glass transition temperature T2 of the inner liner 7 is lower than the glass transition temperature T1 of the mount member 10.

In addition, Example 3 is further larger in the difference ΔE* and further smaller in the loss tangent tan δ·70° C. than Example 2. From this, it is understood that, the noise evaluation value of Example 3 is higher than that of Example 2, and the tire of Example 3 generates lower noise than the tire of Example 2 during travelling of the vehicle. It is noted that since values of the difference ΔT in Examples 2 and 3 are both minus, the glass transition temperature T2 of the inner liner 7 is lower than the glass transition temperature T1 of the mount member 10.

The difference between Comparative Example 3 and Comparative Example 4 is only the thickness d, and they are substantially the same with regard to the other configurations and specifications. A comparison between Comparative Examples 3 and 4 shows that Comparative Example 4 that is larger in the thickness d is higher in the noise evaluation value. It is understood from this that the larger the thickness d is, the higher the attenuation effect at the inner liner 7 is, and the higher the effect of restricting the noise generated during travelling of the vehicle is.

A comparison between Comparative Example 4 and Comparative Example 5 shows that they largely differ from each other in the difference ΔT and their values of the loss tangent tan δ·70° C. are substantially the same with very little difference, and they are substantially the same with regard to the other configurations and specifications. A comparison between Comparative Examples 4 and 5 shows that in Example 5 in which the value of the difference ΔT is plus, the glass transition temperature T2 of the inner liner 7 is higher than the glass transition temperature T1 of the mount member 10, and the noise evaluation value of Comparative Example 5 is higher. It is understood from this that the higher the glass transition temperature T2 of the inner liner 7 is, the higher the attenuation effect at the inner liner 7 is, and the higher the effect of restricting the noise generated during travelling of the vehicle is.

Examples 4, 5, and 6 are different from Examples 1, 2, and 3 in the blend information of the mount member. Specifically, the blend information of the mount member in Examples 1, 2, and 3 is R21, whereas the blend information of the mount member in Examples 4, 5, and 6 is R22. As shown in Table 2, it is understood that even Examples 4, 5, and 6 applied with the mount member of blend information R22 could obtain the same noise evaluation values as Examples 1, 2, and 3.

Table 3 shows the blend information of the inner liner 7 and the mount member 10, the difference ΔE* (=E*1-E*2) between the complex elastic moduli E* of the inner liner 7 and the mount member 10, the loss tangent·70° C. of the inner liner 7, the thickness d, thickness of the mount member 10, difference ΔT (=T2-T1) of glass transition temperature, and evaluation values of noise during travelling of the vehicle (hereinafter referred to as noise evaluation values), in the respective tires of Examples 7 to 17. In each of the examples, the thickness of the mount member 10 was 6.0 mm.

evaluation value. It is understood from this that the larger the thickness d is, the higher the attenuation effect at the inner liner 7 is, and the higher the effect of restricting the noise generated during travelling of the vehicle is.

In addition, the difference between Example 9 and Example 3 is only the thickness d, and they are substantially the same with regard to the other configurations and specifications. Specifically, the thickness d of Example 9 is 0.6 mm and is larger by 0.2 mm than the thickness d (=0.4 mm) of Example 3. A comparison between Example 9 and Example 3 shows that Example 9 that is larger in the thickness d is higher than Example 3 in the noise evaluation value, and is further higher than Example 8 in the noise evaluation value. It is understood from this that the larger the thickness d is, the higher the attenuation effect at the inner liner 7 is, and the higher the effect of restricting the noise generated during travelling of the vehicle is.

TABLE 3

|  | Part | Blend | ΔE* | tan δ-70° C. | Thickness d (mm) | ΔT (° C.) | Noise evaluation value |
|---|---|---|---|---|---|---|---|
| Example 7 | Inner liner | R5 | +0.5 | 0.26 | 0.6 | −3.0 | 108 |
|  | Mount member | R21 |  |  |  |  |  |
| Example 8 | Inner liner | R7 | +1.0 | 0.20 | 0.6 | −2.0 | 120 |
|  | Mount member | R21 |  |  |  |  |  |
| Example 9 | Inner liner | R9 | +1.5 | 0.13 | 0.6 | −1.0 | 140 |
|  | Mount member | R21 |  |  |  |  |  |
| Example 10 | Inner liner | R6 | +0.5 | 0.26 | 0.4 | 2.0 | 108 |
|  | Mount member | R21 |  |  |  |  |  |
| Example 11 | Inner liner | R8 | +1.0 | 0.20 | 0.4 | 3.0 | 120 |
|  | Mount member | R21 |  |  |  |  |  |
| Example 12 | Inner liner | R10 | +1.5 | 0.13 | 0.4 | 4.0 | 140 |
|  | Mount member | R21 |  |  |  |  |  |
| Example 13 | Inner liner | R13 | +1.5 | 0.13 | 0.4 | 10.0 | 140 |
|  | Mount member | R21 |  |  |  |  |  |
| Example 14 | Inner liner | R14 | +1.5 | 0.13 | 0.4 | 20.0 | 140 |
|  | Mount member | R21 |  |  |  |  |  |
| Example 15 | Inner liner | R15 | +1.5 | 0.13 | 0.4 | 21.0 | 135 |
|  | Mount member | R21 |  |  |  |  |  |
| Example 16 | Inner liner | R11 | +2.0 | 0.13 | 0.6 | 4.0 | 142 |
|  | Mount member | R21 |  |  |  |  |  |
| Example 17 | Inner liner | R12 | +2.5 | 0.13 | 0.6 | 4.0 | 138 |
|  | Mount member | R21 |  |  |  |  |  |

It is noted that the noise evaluation values shown in Table 3 were calculated by the same method as the noise evaluation values shown in Table 2.

As shown in Table 3, the difference between Example 7 and Example 1 is only the thickness d, and they are substantially the same with regard to the other configurations and specifications. Specifically, the thickness d of Example 7 is 0.6 mm and is larger by 0.2 mm than the thickness d (=0.4 mm) of Example 1. A comparison between Example 7 and Example 1 shows that Example 7 that is larger in the thickness d is higher than Example 1 in the noise evaluation value. It is understood from this that the larger the thickness d is, the higher the attenuation effect at the inner liner 7 is, and the higher the effect of restricting the noise generated during travelling of the vehicle is.

In addition, the difference between Example 8 and Example 2 is only the thickness d, and they are substantially the same with regard to the other configurations and specifications. Specifically, the thickness d of Example 8 is 0.6 mm and is larger by 0.2 mm than the thickness d (=0.4 mm) of Example 2. A comparison between Example 8 and Example 2 shows that Example 8 that is larger in the thickness d is higher than Example 2 in the noise evaluation value, and is further higher than Example 7 in the noise The difference between Example 10 and Example 1 is only the difference ΔT, and they are substantially the same with regard to the other configurations and specifications. Specifically, the difference ΔT of Example 10 is +2.0. That is, the glass transition temperature T2 of the inner liner 7 is higher than the glass transition temperature T1 of the mount member 10 by 2° C. On the other hand, the difference ΔT of Example 1 is −3.0. That is, the glass transition temperature T2 of the inner liner 7 is lower than the glass transition temperature T1 of the mount member 10 by 3° C. A comparison between Example 10 and Example 1 shows that Example 10 is higher than Example 1 in the noise evaluation value. It is understood from this that in a case where the glass transition temperature T2 of the inner liner 7 is higher than the glass transition temperature T1 of the mount member 10, the attenuation effect at the inner liner 7 is higher and the effect of restricting the noise generated during travelling of the vehicle is higher than in the other case.

The difference between Example 11 and Example 2 is only the difference ΔT, and they are substantially the same with regard to the other configurations and specifications. Specifically, the difference ΔT of Example 11 is +3.0. That is, the glass transition temperature T2 of the inner liner 7 is higher than the glass transition temperature T1 of the mount member 10 by 3° C. On the other hand, the difference ΔT of Example 2 is −2.0. That is, the glass transition temperature T2 of the inner liner 7 is lower than the glass transition temperature T1 of the mount member 10 by 2° C. A comparison between Example 11 and Example 2 shows that Example 11 is higher than Example 2 in the noise evaluation value, and further higher than Example 10 in the noise evaluation value. It is understood from this that in a case where the glass transition temperature T2 of the inner liner 7 is higher than the glass transition temperature T1 of the mount member 10, the attenuation effect at the inner liner 7 is higher and the effect of restricting the noise generated during travelling of the vehicle is higher than in the other case.

The difference between Example 12 and Example 3 is only the difference ΔT, and they are substantially the same with regard to the other configurations and specifications. Specifically, the difference ΔT of Example 12 is +4.0. That is, the glass transition temperature T2 of the inner liner 7 is higher than the glass transition temperature T1 of the mount member 10 by 4° C. On the other hand, the difference ΔT of Example 3 is −1.0. That is, the glass transition temperature T2 of the inner liner 7 is lower than the glass transition temperature T1 of the mount member 10 by 1° C. A comparison between Example 12 and Example 3 shows that Example 12 is higher than Example 3 in the noise evaluation value, and further higher than Example 11 in the noise evaluation value. It is understood from this that in a case where the glass transition temperature T2 of the inner liner 7 is higher than the glass transition temperature T1 of the mount member 10, the attenuation effect at the inner liner 7 is higher and the effect of restricting the noise generated during travelling of the vehicle is higher than in the other case.

The difference between Example 13 and Example 3 is only the difference ΔT, and they are substantially the same with regard to the other configurations and specifications. Specifically, the difference ΔT of Example 13 is +10.0. That is, the glass transition temperature T2 of the inner liner 7 is higher than the glass transition temperature T1 of the mount member 10 by 10° C. In addition, the difference between Example 14 and Example 3 is only the difference ΔT, and they are substantially the same with regard to the other configurations and specifications. Specifically, the difference ΔT of Example 14 is +20.0. That is, the glass transition temperature T2 of the inner liner 7 is higher than the glass transition temperature T1 of the mount member 10 by 20° C. A comparison among Example 13, Example 14, and Example 3 shows that Examples 13 and 14 are larger than Example 3 in ΔT and are equal to Example 9 in the noise evaluation value. It is understood from this that in a case where the glass transition temperature T2 of the inner liner 7 is higher than the glass transition temperature T1 of the mount member 10, the attenuation effect at the inner liner 7 is higher and the effect of restricting the noise generated during travelling of the vehicle is higher than in the other case.

The difference between Example 15 and Example 14 is only the difference ΔT, and they are substantially the same with regard to the other configurations and specifications. Specifically, the difference ΔT of Example 15 is +21.0. That is, the glass transition temperature T2 of the inner liner 7 is higher than the glass transition temperature T1 of the mount member 10 by 21° C. However, Example 15 is lower than Example 14 in the noise evaluation value. It is understood from this that in a case where the glass transition temperature T2 of the inner liner 7 is excessively higher than the glass transition temperature T1 of the mount member 10, the effect of restricting the noise generated during travelling of the vehicle is reduced. Accordingly, the difference ΔT is preferably 20° C. or less.

Example 16 is different from the other examples and comparative examples in that the difference ΔE* is +2.0 that is relatively large, the loss tangent·70° C. is 0.13 that is the smallest, the thickness d is 0.6 mm, and the difference ΔT is +4.0, and they are substantially the same with regard to the other configurations and specifications. A comparison among Example 16 and the other examples and comparative examples shows that Example 16 is the highest in the noise evaluation value, and the highest in the effect of restricting the noise generated during travelling of the vehicle.

The difference between Example 17 and Example 16 is only the difference ΔE*, and they are substantially the same with regard to the other configurations and specifications. Specifically, the difference ΔE* of Example 17 is +2.5 MPa. That is, the complex elastic modulus E*1 of the mount member 10 is larger than the complex elastic modulus E*2 of the inner liner 7 by 2.5 MPa. However, Example 17 is lower than Example 16 in the noise evaluation value. It is understood from this that in a case where the inner liner 7 is excessively soft with respect to the mount member 10, the effect of restricting the noise generated during travelling of the vehicle is reduced. Accordingly, the difference ΔE* is preferably less than 2.5 MPa.

The embodiment of the present disclosure described above includes the following disclosure items (1) to (15).

Present disclosure (1) is a tire including: a tread portion constituting a tire surface; an inner liner constituting a tire inner surface; and a mount member which is provided on the tire inner surface, and to which electric equipment can be attached. In the tire, complex elastic modulus E*1 at 70° C. of a first rubber composition constituting the mount member is measured under measurement conditions: measurement temperature of 70° C., initial strain of 5%, dynamic strain of ±1%, frequency of 10 Hz, and stretch deformation mode, and complex elastic modulus E*2 at 70° C. of a second rubber composition constituting the inner liner is measured under the measurement conditions. The complex elastic modulus E*1 at 70° C. of the first rubber composition is larger than the complex elastic modulus E*2 at 70° C. of the second rubber composition.

With the above-described configuration of the tire, the inner liner can be lower than the mount member in hardness, and the inner liner can be a viscoelastic material that is softer than the mount member. With this configuration, in the tire including the mount member to which the electric equipment is attached, a vibration transmitted from the tread portion to the mount member and the electric equipment during travelling of a vehicle is attenuated by the inner liner, and a vibration transmitted from the mount member and the electric equipment to the tread portion is attenuated by the inner liner. As a result, it is possible to restrict a noise caused by the load of the mount member and the electric equipment.

Present disclosure (2) is the tire according to the present disclosure (1), wherein a difference between the complex elastic modulus E*1 at 70° C. of the first rubber composition and the complex elastic modulus E*2 at 70° C. of the second rubber composition is less than 2.5 MPa.

When the hardness of the inner liner is excessively low with respect to the mount member, the vibration transmitted from the tread portion may not be attenuated at the inner liner or may be, on the contrary, amplified. In this case, the noise generated during travelling of the vehicle may be increased. In addition, the electric equipment attached to the mount member may be failed due to the vibration. For this reason, the difference of complex elastic modulus E* is preferably within a range of producing an effect of restricting the noise, specifically less than 2.5.

Present disclosure (3) is the tire according to the present disclosure (1) or (2), wherein loss tangent tan δ at 70° C. of the second rubber composition constituting the inner liner is 0.26 or less. Here, the loss tangent tan δ at 70° C. of the second rubber composition is measured under measurement conditions: measurement temperature of 70° C., initial strain of 10%, dynamic strain of ±2.5%, frequency of 10 Hz, and the stretch deformation mode.

Present disclosure (4) is the tire according to the present disclosure (1) or (2), wherein loss tangent tan δ at 70° C. of the second rubber composition constituting the inner liner is 0.13 or less. Here, the loss tangent tan δ at 70° C. of the second rubber composition is measured under measurement conditions: measurement temperature of 70° C., initial strain of 10%, dynamic strain of ±2.5%, frequency of 10 Hz, and the stretch deformation mode.

Present disclosure (5) is the tire according to any one of the present disclosures (1) to (4), further including a carcass portion that is disposed more on a side of the tread portion than the inner liner is. In this configuration, a thickness from an inner surface of the carcass portion to an inner surface of the inner liner is 0.6 mm or more.

Present disclosure (6) is the tire according to any one of the present disclosures (1) to (5), wherein glass transition temperature T1 of the first rubber composition of the mount member is a peak temperature corresponding to a peak position in a temperature distribution curve of loss tangent tan δ of the first rubber composition that is measured under measurement conditions: frequency of 10 Hz, initial strain of 10%, amplitude of ±0.5%, and temperature rising speed of 2° C./min. Glass transition temperature T2 of the second rubber composition of the inner liner is a peak temperature corresponding to a peak position in a temperature distribution curve of loss tangent tan δ of the second rubber composition that is measured under measurement conditions: frequency of 10 Hz, initial strain of 10%, amplitude of ±0.5%, and temperature rising speed of 2° C./min. The glass transition temperature T1 is lower than the glass transition temperature T2.

Present disclosure (7) is the tire according to the present disclosure (6), wherein a difference between the glass transition temperature T1 and the glass transition temperature T2 is in a range from more than 0° C. to 20° C. or less.

Present disclosure (8) is the tire according to any one of the present disclosures (1) to (7), wherein the mount member is disposed on the tire inner surface at a position corresponding to a center part of the tread portion in a width direction.

Present disclosure (9) is the tire according to any one of the present disclosures (1) to (8), wherein the tread portion includes a land portion divided by a recessed groove formed on the tire surface, and the mount member is disposed on the tire inner surface at a position corresponding to the land portion.

Present disclosure (10) is the tire according to any one of the present disclosures (1) to (9), wherein the mount member includes: a mounting seat portion fixed to the tire inner surface; and a main body portion to which the electric equipment is attached in a detachable manner.

Present disclosure (11) is the tire according to any one of the present disclosures (1) to (10), wherein the mount member is welded to the tire inner surface.

Present disclosure (12) is the tire according to any one of the present disclosures (1) to (11), wherein a plurality of mount members are provided on the tire inner surface, and the plurality of mount members are arranged on the tire inner surface at equal intervals along a peripheral direction of the tire.

Present disclosure (13) is the tire according to any one of the present disclosures (1) to (12), wherein the electric equipment is a sensor, a wireless communication relay, or a signal transmitter.

Present disclosure (14) is the tire according to any one of the present disclosures (1) to (13), wherein the tire is a tire for passenger car.

Present disclosure (15) is the tire according to any one of the present disclosures (1) to (14), wherein the tire is a pneumatic tire.

The invention claimed is:

1. A tire comprising:
   a tread portion constituting a tire surface;
   an inner liner constituting a tire inner surface and formed from a second rubber composition; and
   a mount member formed from a first rubber composition which is provided on the tire inner surface, and to which electronic equipment can be attached, wherein
   complex elastic modulus E*1 at 70° C. of the first rubber composition of the mount member is measured under measurement conditions: measurement temperature of 70° C., initial strain of 5%, dynamic strain of ±1%, frequency of 10 Hz, and stretch deformation mode, and complex elastic modulus E*2 at 70° C. of the second rubber composition of the inner liner is measured under the same measurement conditions,
   the complex elastic modulus E*1 at 70° C. of the first rubber composition is larger than the complex elastic modulus E*2 at 70° C. of the second rubber composition,
   glass transition temperature T1 of the first rubber composition of the mount member is a peak temperature corresponding to a peak position in a temperature distribution curve of loss tangent tan δ of the first rubber composition and is measured under measurement conditions: frequency of 10 Hz, initial strain of 10%, amplitude of ±0.5%, and temperature rising speed of 2° C./min,
   glass transition temperature T2 of the second rubber composition of the inner liner is a peak temperature corresponding to a peak position in a temperature distribution curve of loss tangent tan δ of the second rubber composition and is measured under measurement conditions: frequency of 10 Hz, initial strain of 10%, amplitude of +0.5%, and temperature rising speed of 2° C./min,
   the glass transition temperature T1 is lower than the glass transition temperature T2, and
   a difference between the glass transition temperature T1 and the glass transition temperature T2 is in a range of 10° C. or more to 20° C. or less.

2. The tire according to claim 1, wherein loss tangent tan δ at 70° C. of the second rubber composition of the inner liner is 0.26 or less and is measured under measurement conditions: measurement temperature of 70° C., initial strain of 10%, dynamic strain of ±2.5%, frequency of 10 Hz, and the stretch deformation mode.

3. The tire according to claim 1, wherein loss tangent tan δ at 70° C. of the second rubber composition of the inner liner is 0.13 or less and is measured under measurement conditions: measurement temperature of 70° C., initial strain of 10%, dynamic strain of ±2.5%, frequency of 10 Hz, and the stretch deformation mode.

4. The tire according to claim 1, further comprising a carcass portion that is disposed more on a side of the tread portion than the inner liner is, wherein a thickness from an inner surface of the carcass portion to an inner surface of the inner liner is 0.6 mm or more.

5. The tire according to claim 1, wherein the mount member is disposed on the tire inner surface at a position corresponding to a center part of the tread portion in a width direction.

6. The tire according to claim 1, wherein
the tread portion includes a land portion divided by a recessed groove formed on the tire surface, and
the mount member is disposed on the tire inner surface at a position corresponding to the land portion.

7. The tire according to claim 1, wherein the mount member includes: a mounting seat portion fixed to the tire inner surface; and a main body portion to which the electric equipment is attached in a detachable manner.

8. The tire according to claim 1, wherein the mount member is welded to the tire inner surface.

9. The tire according to claim 1, wherein a plurality of mount members is provided on the tire inner surface, and the plurality of mount members are arranged on the tire inner surface at equal intervals along a peripheral direction of the tire.

10. The tire according to claim 1, wherein the electronic equipment is a sensor, a wireless communication relay, or a signal transmitter.

11. The tire according to claim 1, wherein the tire is a tire for passenger car.

12. The tire according to claim 1, wherein the tire is a pneumatic tire.

13. The tire according to claim 1, wherein
a difference between the complex elastic modulus $E*1$ at 70° C. of the first rubber composition and the complex elastic modulus $E*2$ at 70° C. of the second rubber composition is 1.5 MPa, and
loss tangent tan $\delta$ at 70° C. of the second rubber composition of the inner liner is 0.13, and is measured under measurement conditions: measurement temperature of 70° C., initial strain of 10%, dynamic strain of ±2.5%, frequency of 10 Hz, and the stretch deformation mode.

* * * * *